US012580948B2

(12) United States Patent (10) Patent No.: US 12,580,948 B2
McCarthy et al. (45) Date of Patent: Mar. 17, 2026

(54) CYBERSECURITY OPERATIONS MITIGATION MANAGEMENT

(71) Applicant: Arctic Wolf Networks, Inc., Eden Prairie, MN (US)

(72) Inventors: Joshua McCarthy, Morgan Hill, CA (US); David B. McKinley, Dartmouth, MA (US); Lance Rund, San Jose, CA (US)

(73) Assignee: Arctic Wolf Networks, Inc., Eden Prairie, MN (US)

( * ) Notice: Subject to any disclaimer, the term of this patent is extended or adjusted under 35 U.S.C. 154(b) by 124 days.

(21) Appl. No.: 18/601,572

(22) Filed: Mar. 11, 2024

(65) Prior Publication Data

US 2024/0305664 A1 Sep. 12, 2024

Related U.S. Application Data

(60) Provisional application No. 63/451,249, filed on Mar. 10, 2023.

(51) Int. Cl.
*H04L 9/40* (2022.01)
(52) U.S. Cl.
CPC ...... *H04L 63/1441* (2013.01); *H04L 63/1425* (2013.01)
(58) Field of Classification Search
CPC .................... H04L 63/1441; H04L 63/1425
See application file for complete search history.

(56) References Cited

U.S. PATENT DOCUMENTS 11,444,974 B1 * 9/2022 Shakhzadyan ...... H04L 63/1466
11,611,590 B1 * 3/2023 Amar .................. G06Q 10/105
(Continued)

OTHER PUBLICATIONS

Toubi et al., "Vulnerability Assessment and Mitigation Strategies for Satellite Communication Systems Under DDoS Attacks," 2024 International Conference on Global Aeronautical Engineering and Satellite Technology (GAST) Year: 2024 | Conference Paper | Publisher: IEEE.*
(Continued)

*Primary Examiner* — Roderick Tolentino
(74) *Attorney, Agent, or Firm* — Barnes & Thornburg LLP

(57) ABSTRACT

Disclosed embodiments provide techniques for cybersecurity operations mitigation management. A plurality of network-connected cybersecurity threat protection applications is accessed. A plurality of inputs from the cybersecurity threat protection applications is received in response to one or more cybersecurity events. A cybersecurity mitigation is initiated, triggered by an analysis of the one or more security events. The mitigation is performed by at least one of the threat protection applications. The analysis is performed on a network-connected computer platform. The network-connected computer platform comprises a security automation and response system (SOAR) that enables the analysis, managing, and validating of the cybersecurity event mitigation. The mitigating and validating are based on a library of cybersecurity mitigation success metrics, including validators, success criteria, and time factors. The cybersecurity mitigation success metric library is maintained and updated based on a machine learning model.

20 Claims, 8 Drawing Sheets

(56) References Cited

U.S. PATENT DOCUMENTS

| | | | | |
|---|---|---|---|---|
| 2016/0012235 A1* | 1/2016 | Lee | G06F 21/6218 | |
| | | | | 726/25 |
| 2016/0188875 A1* | 6/2016 | Weast | G06F 21/55 | |
| | | | | 726/23 |
| 2020/0233955 A1* | 7/2020 | Ramzan | G06F 21/554 | |
| 2020/0410436 A1* | 12/2020 | Daley | H04W 4/40 | |
| 2021/0021644 A1* | 1/2021 | Crabtree | G06F 16/951 | |
| 2021/0092129 A1* | 3/2021 | Aksela | H04L 63/1416 | |
| 2021/0136089 A1* | 5/2021 | Costea | H04L 63/1416 | |
| 2022/0094705 A1* | 3/2022 | Tineo | H04L 63/1441 | |
| 2022/0191224 A1* | 6/2022 | Ståhlberg | G06F 21/554 | |
| 2022/0417264 A1* | 12/2022 | Moon | H04L 63/104 | |
| 2023/0171266 A1* | 6/2023 | Brunner | G06N 3/045 | |
| | | | | 726/23 |

OTHER PUBLICATIONS

Miano et al., "Introducing SmartNICs in Server-Based Data Plane Processing: The DDoS Mitigation Use Case," IEEE Access Year: 2019 | vol. 7 | Journal Article | Publisher: IEEE.*

* cited by examiner

CYBERSECURITY OPERATIONS MITIGATION MANAGEMENT

CROSS-REFERENCE TO RELATED APPLICATIONS

This application claims the benefit of U.S. Provisional Patent Application No. 63/451,249, filed Mar. 10, 2023, the entire contents of which are incorporated herein by reference.

FIELD OF ART

This application relates generally to cybersecurity management and more particularly to cybersecurity operations mitigation management.

BACKGROUND

An adage known as Cooper's Law states that, "All machines are amplifiers." That is to say that all machines increase or expand a human ability, trait, or quality. Even the simplest machines such as the lever or the wheel are used to amplify man's ability to exert force in a particular direction or carry loads across distance. As technology has grown, the ability to use machines to amplify human abilities has increased many times and at faster rates. Mechanical adding machines have given way to electronic calculators, calculators to computers and spreadsheets. Wheelbarrows can be replaced by tractors, pickup trucks, dump trucks, or steam shovels. A human voice can be amplified across a room, projected across a stadium, or captured by microphones and video recorders to be repeated and played across the globe. Food crops can be grown across thousands of acres, tended by computer-controlled machines to plow, weed, water, fertilize and harvest crops with far less human effort than was required even ten years ago. Satellites can transmit information about soil and crop conditions and can be used to direct irrigation, provide pest control, and provide nutrients to specific locations to optimize growing conditions. Within the next few months, satellites will be surveying bodies of water across the planet, transmitting data on temperature, coverage area, salinity, erosion, and so on to computers and imaging systems in order to better track and understand water circulation, climate forecasts, and so on. The planet will be surveyed twice every twenty-one days. Humankind's ability to extend knowledge, exert power, and shape the productivity of the planet is expanded by many times through the use of machines, both mechanical and electronic.

While mechanical and electronic machines have been and continue to be used for beneficial purposes across the globe, they have also been and continue to be used for destructive and malevolent applications as well. Weapons of war have been used as far back in human history as can be studied. The oldest forms of sharpened stone tips and knives date back to our earliest archaeological findings. Bows and arrows date as far back as 11,000 BC. Various boats and ships were used as transportation vessels for armed troops and weapon platforms at least as far back as 2,200 BC. Horse-drawn chariots go as far back as 3,000 BC. The invention of gunpowder in China during the ninth century AD opened the door to hundreds of handgun and artillery pieces of all shapes and sizes.

The advent and growth of computer systems has followed a similar history. Electronic machines that amplify productivity can just as easily amplify malicious and criminal behavior. Computer security attacks routinely target information technology networks, servers, and databases. These attacks, conducted by enemy governments, criminal groups, and individuals, have existed since the very beginning of digital computing systems. At first, attacks on computer systems required physical access to the systems. Computer systems and peripheral devices were large and required special environmental conditions. They were housed in computer rooms, where access was strictly limited to authorized systems operators. A person attempting to attack the systems by loading malicious code, removing data, or otherwise causing harm to the computer systems needed physical access to the computer rooms and systems. Data could be mischievously obtained by removing printed copies, cards, tapes, or storage media. However, limited physical access to computers was highly inconvenient for users. To improve user access, remotely located terminals were provided. Users could access computers from terminals distributed around workplaces, campuses, hospitals, and other organizations. Computers were able to access each other and the terminals through hardwired and telephonic connections. However, improved access for authorized users also enhanced illicit access. Physical connections could be tapped, malicious code could be introduced, or sensitive data could be collected or stolen. Today, both wired and wireless networking technologies enable computer access from virtually any location on earth and beyond. Such access enables authorized users to log into a computer network from the office, coffee shop, airplane, or vacation spot. As a result, criminals can also access computer systems from around the globe, without regard to ownership, jurisdiction, or national borders.

SUMMARY

Governments, corporations, small businesses, families, and individuals all depend on reliability and continuous availability of digital computer systems. Many organizations are heavily reliant on information technology platforms to the point where they could not operate without them. As computer technologies have become more portable and flexible, the need to protect and maintain the operation of these systems has become more challenging. Cybersecurity threats abound at every level of computing operations, requiring monitoring and protective hardware and software systems to deliver effective detection, diagnosis, management, and mitigation of the threats. Organizations of all sizes are keenly aware of the cybersecurity threats to their operations and significant portions of their budgets and resources are directed at maintaining vigilance against them. IT departments within the organizations actively configure, implement, and deploy state-of-the art cybersecurity hardware and software with an eye toward securing their IT infrastructure against the threats. While routine, preventative measures such as installing updates to applications and operating systems software, deactivating accounts of former users, completing security ("white hat") checkups, and maintaining other housekeeping activities are common to successful IT operations, these measures alone are inadequate to provide comprehensive IT infrastructure protection. The cybersecurity threats evolve rapidly and continue to become significantly more sophisticated. Thus, constant system-wide vigilance and anticipatory action are demanded. Nearly as soon as a cybersecurity solution is found that identifies, responds to, and eradicates a threat such as a virus; thwarts a Trojan horse program; or detects and deletes a phishing attack; culprits behind the cybersecurity attacks adapt their techniques by using new attack vectors; advanced social engineering ploys; hacking; data theft; and many other deceptive, malicious, and illegal techniques.

A computer-implemented method for cybersecurity management is disclosed comprising: accessing a plurality of network-connected cybersecurity threat protection applications; receiving a plurality of inputs from the cybersecurity threat protection applications, wherein the plurality of inputs is received in response to one or more cybersecurity events; initiating a cybersecurity mitigation, wherein the initiating is triggered by an analysis of the one or more cybersecurity events, wherein the analysis is performed on a network-connected computer platform; managing the cybersecurity mitigation, using the network-connected computer platform; and validating the cybersecurity mitigation, using the network-connected computer platform. A computer program product embodied in a non-transitory computer readable medium for video analysis can include code which causes one or more processors to perform operations of: accessing a plurality of network-connected cybersecurity threat protection applications; receiving a plurality of inputs from the cybersecurity threat protection applications, wherein the plurality of inputs is received in response to one or more cybersecurity events; initiating a cybersecurity mitigation, wherein the initiating is triggered by an analysis of the one or more cybersecurity events, wherein the analysis is performed on a network-connected computer platform; managing the cybersecurity mitigation, using the network-connected computer platform; and validating the cybersecurity mitigation, using the network-connected computer platform.

In further embodiments, a computer system for content generation is provided comprising: a memory which stores instructions; one or more processors attached to the memory wherein the one or more processors, when executing the instructions which are stored, are configured to: access a plurality of network-connected cybersecurity threat protection applications; receive a plurality of inputs from the cybersecurity threat protection applications, wherein the plurality of inputs is received in response to one or more cybersecurity events; initiate a cybersecurity mitigation, wherein the initiating is triggered by an analysis of the one or more cybersecurity events, wherein the analysis is performed on a network-connected computer platform; manage the cybersecurity mitigation, using the network-connected computer platform; and validate the cybersecurity mitigation, using the network-connected computer platform.

One or more of the computer-implemented method, computer program product embodied in a non-transitory computer readable medium, and the computer system can include one or more of the following features. For example, the embodiments can include creating a library of cybersecurity mitigation success metrics. The success metrics can include cybersecurity validators. The cybersecurity validators can include success criteria. The cybersecurity validators can include a time factor. The time factor can include a number of days post-mitigation initiation. The validating can be based on achieving one or more of the cybersecurity mitigation success metrics. The embodiments can also include updating the library of cybersecurity mitigation success metrics. The updating can be based on an additional input from the cybersecurity threat protection applications. The updating can also be based on analysis by the network-connected computer platform. The analysis can include metadata analysis, where metadata can be received from at least one of the group of cybersecurity threat protection applications. The updating can be based on human-supplied input. The updating can be based on a machine learning model that was trained using a cybersecurity mitigation completion success. The validating can provide a mitigation completion confirmation. The cybersecurity mitigation can be performed by at least one threat protection application of the plurality of network-connected cybersecurity threat protection applications. The cybersecurity mitigation can be performed by the network-connected computer platform. The network-connected computer platform can include a security automation and response (SOAR) system. The SOAR system can be configured to enable at least one of (i) the analysis of the one or more cybersecurity events, (ii) the managing the cybersecurity mitigation, or (iii) the validating the cybersecurity mitigation.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
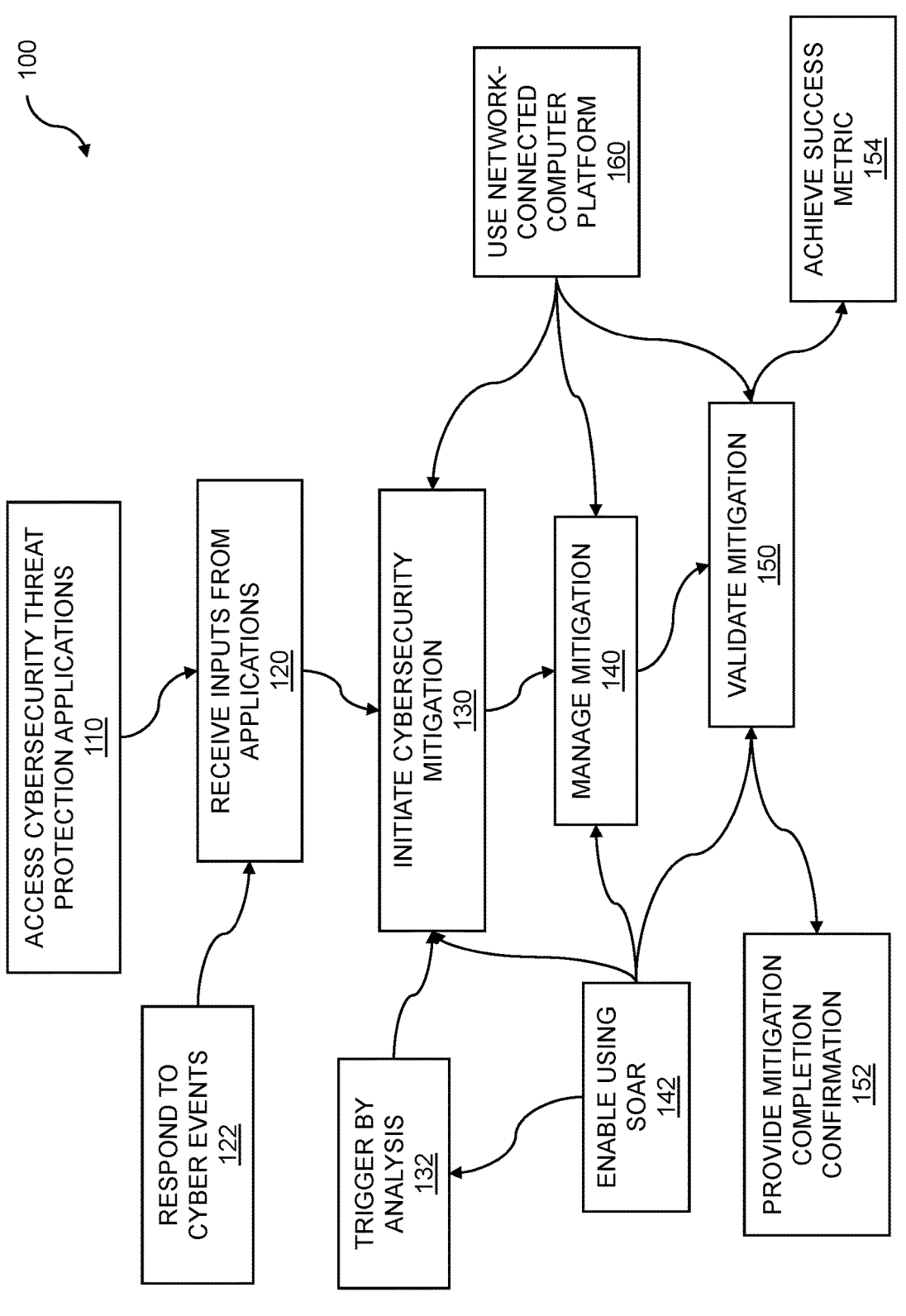
FIG. 1 is a flow diagram for cybersecurity operations mitigation management.

Today's information technology systems are under routine and constant attacks by hackers, spammers, confidence tricksters, and all manner of criminals who are hiding onshore, offshore, or even with the enterprises themselves. These culprits include individual criminals, gangs, and organized crime; expert hackers sponsored and protected by enemy and rogue governments; and terrorists and extortionists; among many others with malicious intent. The attacks are directed at businesses, government agencies, hospitals, research laboratories, retailers, universities, and other enterprises and organizations. Data shows that cybersecurity threats such as cyberattacks, phishing expeditions, and attempted data theft or destruction have been detected to occur as often as every few seconds. By far the most frequently targeted enterprises include those from sectors such as high technology, finance, retail, and government agencies including defense, air traffic control, and revenue. Other high-value targets include media companies who are called out by cyberattackers for allegedly insulting a religion or humiliating national leaders. Further, national infrastructures such as pipelines and energy grids are targets because of the disruption caused by their being disabled or interrupted.

Small businesses and individual users are also under threat. Identity theft, fraud, hacking of bank accounts, database breaches, ransomware, and so on plague businesses and families daily across the globe. There are many cybersecurity applications and services available to help organizations and individuals protect and defend against cyberattacks. However, these applications can be complicated to manage and require constant updating in order to keep abreast of the most recent attacks. Even small businesses may require several different security systems or services to fully protect their infrastructure and end-user systems. In many cases, the cybersecurity systems do not work in concert with one another, so that management of the various applications becomes a challenge. Large organizations have even more complications to deal with. Along with multiple cybersecurity protection applications, ensuring that all users have the most recent versions of applications installed and running can be a task requiring both software monitoring and support staff resources to maintain. Even industry specialists use sophisticated management applications to monitor the many and varied security tools running within their network environments. As the number of cyberattacks increase and the requirements to mitigate and validate successful mitigation steps become more complex, better technologies and methods are required.

Techniques for cybersecurity operations mitigation management are disclosed. Cybersecurity mitigation and validation can be accomplished through creating a library of mitigation success metrics used to measure the accomplishment of mitigation tasks as they occur and improve the performance of mitigation processes over time. A plurality of network-connected cybersecurity threat protection applications is accessed. The threat protection applications include endpoint protection, anti-phishing and antivirus tools, firewalls, denial of service sensing, ransomware detection, and so on. A plurality of inputs is received from the cybersecurity threat protection applications, wherein the plurality of inputs is initiated by one or more cybersecurity events. The inputs can include types of cybersecurity events, numbers of events, numbers of affected users and devices, etc. A computer platform is used to analyze the plurality of inputs from the cybersecurity threat protection applications. The inputs can include information such as status and other information associated with a detected cybersecurity threat. The inputs can include a time and a frequency of cybersecurity threat protection application inputs, techniques used to receive the application inputs, what tool provided the application inputs, who was operating a tool or device that initiated the input, etc. The inputs are forwarded to a security automation and response (SOAR) system running on a network-connected computer platform. Cybersecurity threat mitigation tasks are generated. The mitigation tasks can include initiating workflows, removing viruses and trojans, notifying law enforcement, etc. As the mitigation tasks are deployed and completed, logs from the cybersecurity protection applications are forwarded to the SOAR system and compared to a library of mitigation success metrics. The metrics provide a way of evaluating the success of the mitigation measures and validating the completion of the mitigation process.

FIG. 1 is a flow diagram 100 for cybersecurity operations mitigation management. The flow 100 includes accessing a plurality of network-connected cybersecurity threat protection applications 110. The threat protection applications can monitor, protect, and defend computer systems, data systems, data networks, handheld electronic devices, and so on against various types of malicious attacks. The malicious attacks can include malware attacks, hacking attacks, denial of service attacks (DoS), distributed denial of service attacks (DDoS), man-in-the-middle attacks, ransomware attacks, and so on. The applications can include antivirus and anti-phishing applications, tools for threat hunting and threat intelligence, identity verification, endpoint protection, and so on. The applications can further include firewalls and other blocking technology. The plurality of cybersecurity threat protection applications can include at least two different data management schemas. A management schema can be based on a security domain which can contain one or more database objects. Access to the one or more database objects can be controlled by granting access privileges to each user or role, where a role can include a user, a manager, an administrator, and so on. The access can be controlled by an access control list (ACL).

Threat protection applications are used to provide a variety of protections and defenses for computer systems, data systems, data networks, endpoint devices, and so. The threat protection applications are installed on the various IT components to counter the increasing variety of malicious cyberattacks. The plurality of cybersecurity threat protection applications can include security information and event management (SIEM) applications. More advanced techniques can also be applied. In embodiments, the plurality of cybersecurity threat protection applications can include security orchestration, automation, and response (SOAR) applications (further described below). As discussed above and throughout, the malicious cyberattacks can include malware attacks, hacking attacks, distributed denial of service attacks (DDoS), man-in-the-middle attacks, and so on. The applications can include antivirus, anti-phishing, and anti-cryptojacking applications; tools for threat hunting and threat intelligence; identity verification; endpoint protection; forensic investigation; incident management; and so on. The plurality of cybersecurity threat protection applications can include data management schemas. A management schema can be based on a security domain which can contain one or more database objects. Access to the one or more database objects can be controlled by granting access privileges to each user or role, where a role can include a user, a manager, an administrator, and so on.

The flow 100 includes receiving a plurality of inputs 120 from the cybersecurity threat protection applications, wherein the plurality of inputs is received in response to one or more cybersecurity events 122. The inputs can include alarms, alerts, notifications, status changes and updates, warnings, etc. The plurality of inputs can be received from one or more network-connected cybersecurity threat protection applications. The plurality of inputs can include threat notifications. The inputs can be in reference to virus detection, Trojan horse detection, insider threat detection, cryptojacking detection, intrusion detection, and so on. The inputs that are received can include one or more signals, flags, SMS or email messages, indications, and other outputs generated by the plurality of applications. The inputs can be received as part of a cybersecurity management system running on a network-connected computer platform. The inputs can include a simulated or synthetic notification, test notifications, status notifications, and so on. The simulated or test inputs can be used to determine the efficacy of detecting a threat and generating one or more inputs based on the threat. The simulated or test inputs can be used to test various threat scenarios. The testing can be based on simulation, emulation, hypothesis testing, and the like.

In embodiments, information about a device for which cybersecurity threat inputs were received can include a management level designation for the device or a user of the device. A management level designation for a device can include an unmanaged personal electronic device, an unsupported device, a managed corporate device, and so on. The management level designation for a user can include an employee, a temporary employee, a contractor, an affiliate, and the like. In other embodiments, the information about a device for which cybersecurity threat inputs were received can include a usage location designation. The usage location can include onsite or offsite; a building, floor, and room; a physical street address; a regional or national location; etc. In further embodiments, the information about a device for which cybersecurity threat inputs were received can include a security clearance designation for the device or a user of the device. A security clearance designation for a device or a user of the device can include a military or government clearance level, a corporate clearance level, access controlled by an access control list (ACL), and so on. In other embodiments, the information about a device for which cybersecurity threat inputs were received can include a security metric designation for the device or a user of the device. A security metric can include one or more of a mean-time-to-detect and mean-time-to-respond to a threat notification for the device or the user. A security metric can include known vulnerabilities of the device or known vulnerabilities based on what the user has access to. A security metric can include known security settings associated with the device.

The flow 100 includes initiating a cybersecurity mitigation 130, wherein the initiating is triggered by an analysis 132 of the one or more cybersecurity events 122, wherein the analysis is performed on a network-connected computer platform 160. In embodiments, the analysis includes metadata analysis, wherein the metadata is received from at least one of the plurality of cybersecurity threat protection applications. The network-connected computer platform can include a handheld electronic device, a desktop or laptop computer, a server, a cloud server, a cloud-based analysis service, and so on. The metadata, or "data about data", can include critical information associated with one or more inputs. The metadata can include a type of cybersecurity threat; identifying information associated with an affected device, identity, and location of an at-risk user; identifying information and location of vulnerable or affected IT infrastructure; and the like. The metadata can include information types such as status information, a type of device, a type of user, etc. The status information can be associated with a type of detected cybersecurity threat. Other metadata can include a time and a frequency of cybersecurity threat protection application inputs, techniques used to receive the application inputs such as observed or automatically delivered, who or what tool provided the application inputs, etc. In embodiments, the analysis can determine commonality of threats among the plurality of inputs. The commonality of threats can include virus threats, intrusion events, etc. In embodiments, the analyzing is based on parsing incoming traffic alerts from the cybersecurity threat protection applications. Since the various network-connected cybersecurity threat protection applications can be provided by a plurality of vendors, and since the inputs provided by the applications can include differing messages, formats, etc., the traffic alerts can be parsed and compared. That is, the inputs can be received from more than one cybersecurity threat protection application, and the formats of the inputs, can be different. An "alert" from one application may be labeled as an "alarm" by another, while both applications can detect the same virus attack. In embodiments, the cybersecurity threat can include a zero-day attack. A zero-day attack can be based on a newly discovered or previously undisclosed flaw in hardware, software, operating systems, network switches or routers, etc. The "zero-day" can refer to an amount of time (e.g., zero days) between the time of the exploit being used and the time that experts develop a technique for countering the attack.

The network-connected computer platform 160 comprises a security automation and response (SOAR) system. The SOAR system enables 142 the analysis of the one or more cybersecurity events. The SOAR can be based on one or more cybersecurity threat protection applications, tools, techniques, and so on. The SOAR can enable data collection from a wide range of data sources such as threat data sources. The threat data sources can include data uploaded by cybersecurity experts, data produced by cybersecurity threat protection applications, and so on. The SOAR can be used to manage threat protection processes, anti-threat technologies, and human expertise. The SOAR can centralize management of IT assets such as networks, processors, data storage elements, etc. The SOAR can provide threat alerts and can also provide contexts for the alerts. The SOAR can further automate responses to threats, adapt the responses using machine learning, and so on. The SOAR can enable the managing and validating of the cybersecurity mitigation (further described below).

Initiating a cybersecurity mitigation 130 comprises generating a cybersecurity threat response or set of responses based on the analysis of the inputs from the plurality of cybersecurity threat protection applications. A generated response can include initiating a threat response process or protocol, starting a workflow or "punch list" to address the threat, and so on. The response can further include initiating a lockdown of a device or access to the device, commencing a threat eradication procedure, and so on. The response that is generated targets one or more types of events. In embodiments, the cybersecurity threat response can address a zero-day event. A zero-day event is an attack or exploit of a software security flaw that is unknown to software developers or users prior to the attack. In some cases, the attack is coordinated by a group of attackers in order to gain access to one or more computer systems and the data they contain. Since the security flaw is unknown to the software developers prior to the first day of the event, the attack is called a zero-day event, in that there are zero days to respond to attack before it occurs. All of the responses by software developers and users to such an attack are in reaction mode, rather than being proactive. In other embodiments, the response can be provided to a cybersecurity threat management entity such as cybersecurity threat management component or entity. The cybersecurity threat management entity can include a human-based entity, a machine-based entity, a trained neural network, and so on. In embodiments, the cybersecurity threat management entity can include one or more cybersecurity professionals. The one or more professionals can activate a workflow, initiate a cybersecurity process or policy, and the like.

The mitigating a cybersecurity threat response can include generating a notification, where the notification can be used to trigger a variety of responses. The generated response to a cybersecurity threat can include managing one or more devices; individual users, user groups, or types of users; portions or regions of a data network; and so on. The generating a response can include granting user access to an asset to fix a problem, denying access to lock out access to the asset, isolating one or more devices, notifying security or law enforcement, and the like. The generated response can include one or more procedures, protocols, tasks, techniques, workflows, etc., associated with cybersecurity. In embodiments, the generating a response to a cybersecurity threat can include managing one or more of antivirus analysis, phishing attack response, review, security information and event management (SIEM) triage, threat hunting, insider threat protection, threat intelligence, identity verification reinforcement, endpoint protection, forensic investigation, cryptojacking, vulnerability, cloud security orchestration, and end-to-end incident lifecycle cases.

The flow 100 includes managing the cybersecurity mitigation 140, using the network-connected computer platform 160. In embodiments, the SOAR network-connected computer platform enables the managing of the cybersecurity mitigation. The cybersecurity mitigation 130 is performed by at least one threat protection application of the plurality of network-connected cybersecurity threat protection applications. Cybersecurity threats can be detected by one or more applications, such as network-connected cybersecurity threat protection applications. The detection of the cybersecurity threats can generate one or more inputs that can be received by a component such as a cybersecurity management component. The inputs can be received in the form of flags, warnings, notices, alerts, and so on that can be received via email, text message (SMS), graphical alerts on a screen associated with a computing device, etc. A network-based computer platform is used to analyze metadata associated with the plurality of inputs from the cybersecurity threat protection applications. The analysis can be used to determine a type of threat, the number of inputs received, and so on. The metadata can include a type of threat, an affected device, an at-risk user, vulnerable IT infrastructure, and the like. A complex cybersecurity attack can trigger thousands of inputs from multiple threat protection applications in a short period of time. Triaging and analyzing the inputs requires managing the inputs and generating responses to mitigate the threats. The managing includes notifying the cybersecurity staff members via real-time console warnings and alarms, emails, text messages and so on. In some instances, users are notified of threats and mitigation procedures underway, or changes in availability of network assets, external websites, and so on.

In some instances, the cybersecurity mitigation can include deploying application patches or upgrades to one or more user workstations, network components, connected hand-held devices, and so on. The SOAR network-connected computer platform can work in concert with software deployment applications to ensure that the correct patches and upgrades are deployed in a timely manner and to track completed installations as they occur. In some instances, additional security scans are required for network users and devices. Not all users or network-connected devices are connected and available for updates or for scanning at the same time. Deployment of a large patch to multiple users or devices on a network can significantly impact overall network traffic and in some cases cause as much or more disruption to a group of users as the original cybersecurity threat. The deployment or other mitigation steps may be staggered across hours, time zones, geographical location, groups of users, and so on. Cybersecurity threat management and mitigation requires decision-making based on the significance of the threat, the scope of the threat impact, and the resources required to deploy and confirm a satisfactory mitigation, including the timing of the mitigation steps, as well as other factors.

Cybersecurity threat mitigation includes proactive as well as reactive steps. In some embodiments, the SOAR network-connected computer platform can manage software patches and upgrades to network-based equipment and user devices as they are released by software and hardware vendors.

Many updates to software and hardware applications are developed by vendors in response to cybersecurity threats to their products, as well as feature-function improvements to the applications for users. An inventory of software and firmware updates can be received and cataloged by the SOAR system and routed to an appropriate testing environment. The SOAR system can schedule testing and can track deployment of approved updates so that all network nodes are running the most recent versions of application, operating system, networking, and peripheral device control software available.

The flow 100 includes validating the cybersecurity mitigation 150, using the network-connected computer platform 160. Validating the cybersecurity mitigation includes confirming that the selected mitigation steps are taken; measuring the effectiveness of the mitigation steps; recording the speed of detection, analysis, mitigation process selection, and mitigation deployment; reporting on the mitigation steps, and updating logs and other archive repositories related to cybersecurity events. In embodiments, the validating is comprised of creating a library of cybersecurity mitigation success metrics 154. The success metrics comprise cybersecurity validators, including success criteria and a time factor. The time factor includes several days of post-mitigation initiation. The validating is based on achieving one or more of the cybersecurity mitigation success metrics 154. A successful cybersecurity mitigation can be described as an event in which a cybersecurity threat is detected and correctly identified as soon as it comes into contact with the first network node or group of nodes under attack; in which the correct mitigation steps are selected and brought to bear on the threat immediately after the threat is identified; in which the correct mitigation steps are successfully deployed and implemented on all network points under threat; in which prevention steps are clearly identified and put in place to prevent future occurrences; and in which all steps taken from the beginning to the end of the event are clearly logged and documented for network security staff and control systems to review and integrate into future security policies. Since cybersecurity attacks are frequent and continue to change as culprits refine their attempts to interfere with and steal from legitimate computer networks, security systems, policies, and practices must continue to learn and grow to maintain proper functioning of the systems and users they serve.

As network security has continued to grow, many success stories and best practices have become apparent. In embodiments, these mitigation steps can be stored in a machine learning library of cybersecurity success metrics 154. Data from cybersecurity experts and from recorded events in the SOAR network-connected computer platform can be converted to machine learning training data. The data can contain information about the plurality of cybersecurity threat protection applications and logged incidents of successful mitigating steps. The training data can further include historical data associated with past inputs received, synthetic data generated for machine learning training purposes, and so on. The training data is accompanied by expected outcomes inferred based on processing or analyzing the training data. The expected outcomes can include determining a true positive analysis of inputs, confirming a true positive threat event, and the like. The expected outcomes can include workflows to locate, remove, remediate, etc., the cybersecurity threat. The expected outcomes can include actions such as one or more of removing the virus from the email messages, blocking the sender of the messages, updating antivirus software, pushing antivirus software updates out to client computers and portable devices, etc. A neural network can be trained using the machine learning training data. The training of the neural network can include providing training data to the neural network, observing inferences formed by the neural network, adjusting weights associated with nodes within the neural network, and so on. The observing and adjusting can continue until the neural network is able to form the expected inferences (outcomes) for the training data provided. Once the training data has been analyzed and integrated into the neural network, it can be used to execute the analyzing, the triaging, and the generating on the neural network that was trained.

In embodiments, the validating includes updating the library of cybersecurity mitigation success metrics. The updating is based on an additional input from the cybersecurity threat protection applications and analysis by the network-connected computer platform. The updating can be based on human-supplied input and on a machine learning model. The machine learning model can be trained using cybersecurity mitigation completion success data. The neural network can continue to "learn" based on processing of data other than training data. The learning can be accomplished by the network to improve convergence speed, inference accuracy, etc. In the flow 100, the accessing, the receiving, the analyzing, the triaging, and the generating are managed by a security orchestration, automation, and response (SOAR) system running on the network-connected computer platform 160. Discussed previously and throughout, the SOAR system can comprise a cybersecurity threat management entity, where the cybersecurity threat management entity can be based on software, hardware such as specialized hardware, a suite of software tools or applications, and the like. Human-supplied input can include data from other systems not directly connected to the SOAR system as well as direct observations made by security and support staff. It can also include scores and ratings given by users and support staff regarding the effectiveness of communications, speed of responses, impact of downtime, and so on. Suggestions of additional parameters to use in the SOAR assessment criteria can also be made by human input.

The validating provides a mitigation completion confirmation 152. In embodiments, some cybersecurity mitigation steps can take many hours or days to complete. Large networks with a plurality of users, network infrastructure nodes, applications, servers, and databases can require many hours to receive, validate, update, and report progress to security applications and management systems for each cybersecurity mitigation event. In a large network, it can be the case that not all users are logged into a network at the same time; or not all printers or other peripheral devices are turned on, or they are in use to a degree that requires mitigation steps to wait for off-hours to execute. Large networks with multiple locations may have time zone factors to consider. Government, infrastructure, and financial systems can have mandated availability commitments that require cybersecurity mitigation steps to be scheduled for low or zero-usage blocks of time. In some cases, decisions must be made by security staff or machine learning models weighing potential risks of cybersecurity threats with network system availability requirements. Thus, confirmation of completion of mitigation steps 152 are of vital importance to security staff and machine learning systems in maintaining network security and responding to challenges as they occur. For example, the mitigation steps 152 (and/or other steps depicted in FIG. 1) can be implemented as part of a managed risk platform, system, and process, such as ARC- TIC WOLF MANAGED RISK, and/or as part of a managed detection and response platform, system, and process, such as ARCTIC WOLF MANAGED DETECTION AND RESPONSE. Managed risk solutions, and managed detection and response solutions are described in greater detail below with regard to FIG. 6.

In embodiments, the SOAR network-connected computer platform collects logs and other status data from the plurality of cybersecurity threat protection applications as mitigation steps are deployed and implemented. For example, a computer virus incident can require a patch to all user workstations and network-enabled mobile devices. The patch must be received and validated from the anti-virus software vendor, tested against the various types of hardware in use by network users, deployed by the anti-virus application or another network-based software management system, and installed on the network user hardware (or scheduled to be installed later). As the virus patches are installed on the network user workstations and mobile devices, logs recording the success or failure of the installation are generated and copies sent back to the SOAR systems overseeing the installations. Emails or text messages can be generated to users informing them of the need to log into the network to receive the patch. Help desk systems and personnel can be updated to follow up with users whose hardware failed to complete the patch update successfully, or who have not logged into the network to receive and install the patch in an acceptable time period. As the anti-virus software success and failure logs are accumulated by the SOAR management system, a mitigation completion report 152 showing the number of network nodes remaining and percentage of completions can be generated for the network security staff and the machine learning model. Times to deploy, install, and validate the virus patch can be collected and included in the mitigation completion confirmation reporting. The mitigation completion confirmation data can be analyzed to look for ways to improve deployment procedures; to target older hardware or software versions to be updated, repaired, or replaced; to follow up with support staff regarding improved procedures; to inform users and management of the success rate of the cybersecurity threat mitigation processes, and so on.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
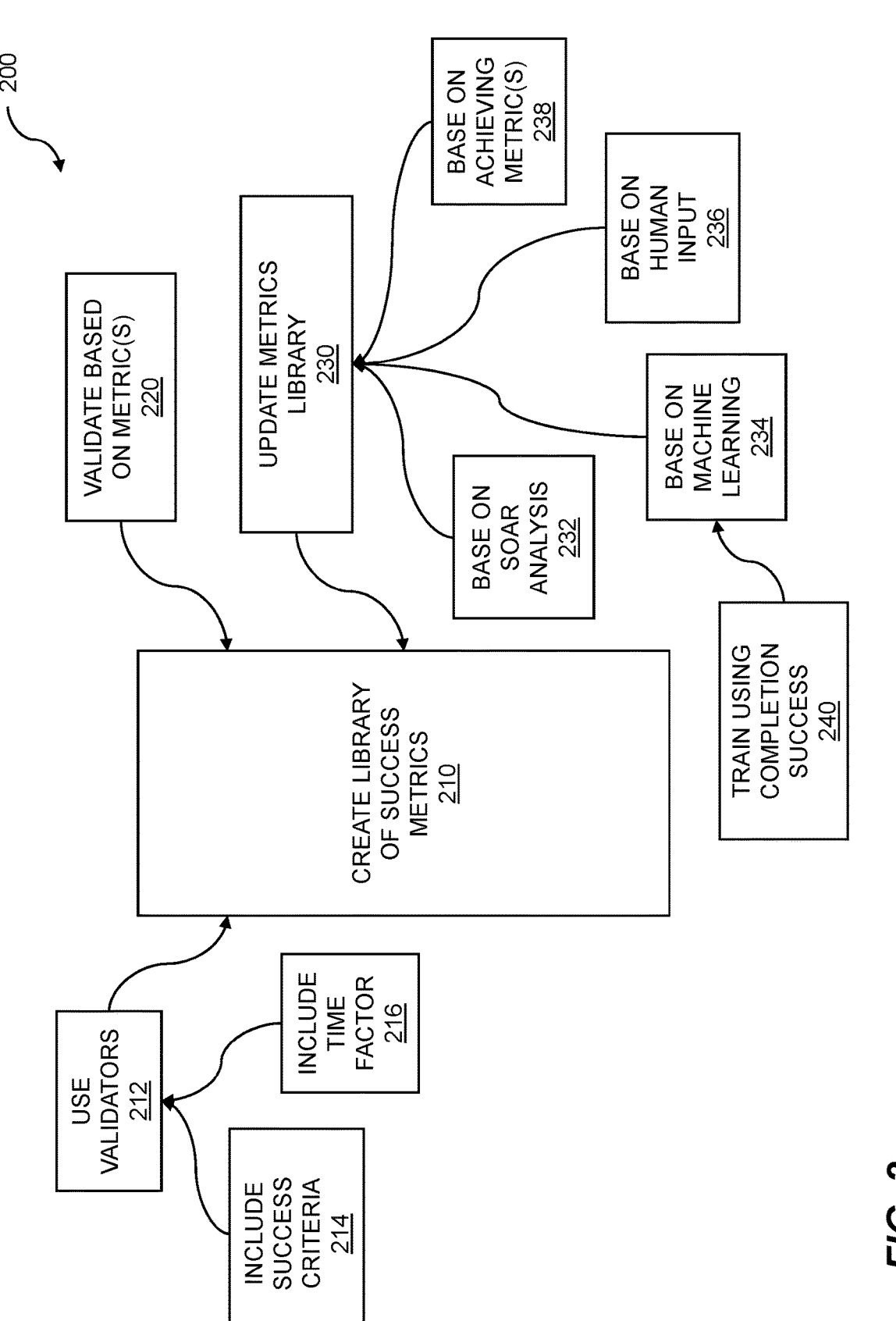
FIG. 2 is a flow diagram for success metric management.

FIG. 2 is a flow diagram 200 for success metric management. The flow 200 includes creating a library of cybersecurity mitigation success metrics 210. In embodiments, the success metrics comprise cybersecurity validators 212, including success criteria 214 and a time factor 216. The time factor includes a number of days post-mitigation initiation. The library of cybersecurity mitigation success metrics 210 can be used to validate a cybersecurity mitigation event based on achieving one or more of the cybersecurity mitigation success metrics 220. For example, success metrics related to a cybersecurity virus attack on a group of users can include the time it takes system administrators to acknowledge and respond to an anti-virus alert, the amount of time required to refresh or rebuild infected workstations, the number of workstations impacted, the version of anti-virus software and signature libraries running on infected workstations, the amount of time required to disconnect infected workstations from the network, and so on. These metrics can be used by the SOAR system to compare cybersecurity events to successful event metrics from previous occasions. For example, one success criteria metric 214 stored in the library 210 can state that the time from initial detection of a suspect file on a user station to a response by a cybersecurity administrator should be eight minutes or less. In many virus or malware events, anti-virus software running on a workstation can detect a potential problem with a file, flag it, warn the user, and take initial steps to isolate the file within a few seconds. At the same time, an alert is sent to an anti-virus management system that can be part of a larger SOAR system. Once the SOAR management system receives the alert, further mitigation steps taken by a human administrator or a machine learning model should begin mitigation. In this example, a successful mitigation response from the SOAR system to a malware or virus attack on a user workstation should occur in eight minutes or less after the initial detection of a problem on a workstation. As the event progresses, additional metrics can be collected and compared to metrics in the success metric library. This can include, for example, comparing the version of the antivirus software and the virus signature library running on the infected workstation to the most current versions available from the software vendor; checking the steps taken by human administrators against a best-practice list of mitigation steps; and so on. In a broader attack involving multiple workstations, the amount of time required to update all related workstations with mitigating software patches can be compared to an optimal time for the same number of workstations, or the time per workstation or network node as recorded in the success library. In a more proactive mode, the amount of time between the release of a software upgrade from a cybersecurity vendor to its deployment to appropriate workstations in a network can be compared to published best practice times or internal standards set by management. As cybersecurity events occur, the comparisons actual tasks and times to success metrics can be used to validate the mitigation process 220, to identify areas to be improved, and to highlight people and processes that are working well.

Cybersecurity is an ongoing process that is constantly evolving. In embodiments, the library of cybersecurity mitigation success metrics must be routinely updated 230. The updating is based on additional input from the cybersecurity threat protection applications, analyses by the SOAR network-connected computer platform 232, and metadata analysis received from at least one of the plurality of cybersecurity threat protection applications. The metadata, or "data about data" can include critical information associated with one or more inputs. The metadata can include a type of cybersecurity threat, identifying information associated with an affected device, recognizing identity and location of an at-risk user, identifying information and location of vulnerable or affected IT infrastructure, and the like. The metadata can include information types such as status information, a type of device, a type of user, etc. The status information can be associated with a type of detected cybersecurity threat. Other metadata can include the time and a frequency of cybersecurity threat protection application inputs, techniques used to receive the application inputs such as observed or automatically delivered, who or what tool provided the application inputs, etc. As cybersecurity events occur and are measured, the success metrics achieved 238 can be used to update the metrics library. For example, the average time required for a cybersecurity administrator to respond to a possible malware or virus infection may be five minutes rather than eight. The library can be updated to reflect the faster average response time. Updates can be based on human-supplied input 236 or a machine-learning model 234. As mentioned previously and throughout, the machine learning model can be trained using cybersecurity mitigation completion success metrics 240. In an active SOAR cybersecurity environment, updates from the plurality of threat protection application vendors are received on a weekly or monthly basis. For example, significant malware, viruses, or other vulnerabilities can be discovered, leading to an unscheduled release of software patches to deal with the threat. The cybersecurity team can decide to deploy such a patch immediately or overnight, depending on the severity. The version of the software patch or signature library can be uploaded to the success metric library so that as the patch is deployed, the success of the patch installation across the network can be measured and reported. As the updates are installed, the number of first-time successful patches can be compared to previous release events recorded in the success metric library. A lower success rate can be investigated to determine if network response time or aging out of particular user workstations might be responsible. As the library of success metrics is updated and SOAR analysis is improved and acted upon, the cybersecurity team can become increasingly proactive in their methods and procedures. While there is no conclusion to cybersecurity preparedness, the application of success metrics combined with intentional, coordinated responses to emerging threats and industry trends can allow more time and resources to be dedicated to protection and preparedness rather than reacting to immediate threats already within the network environment.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
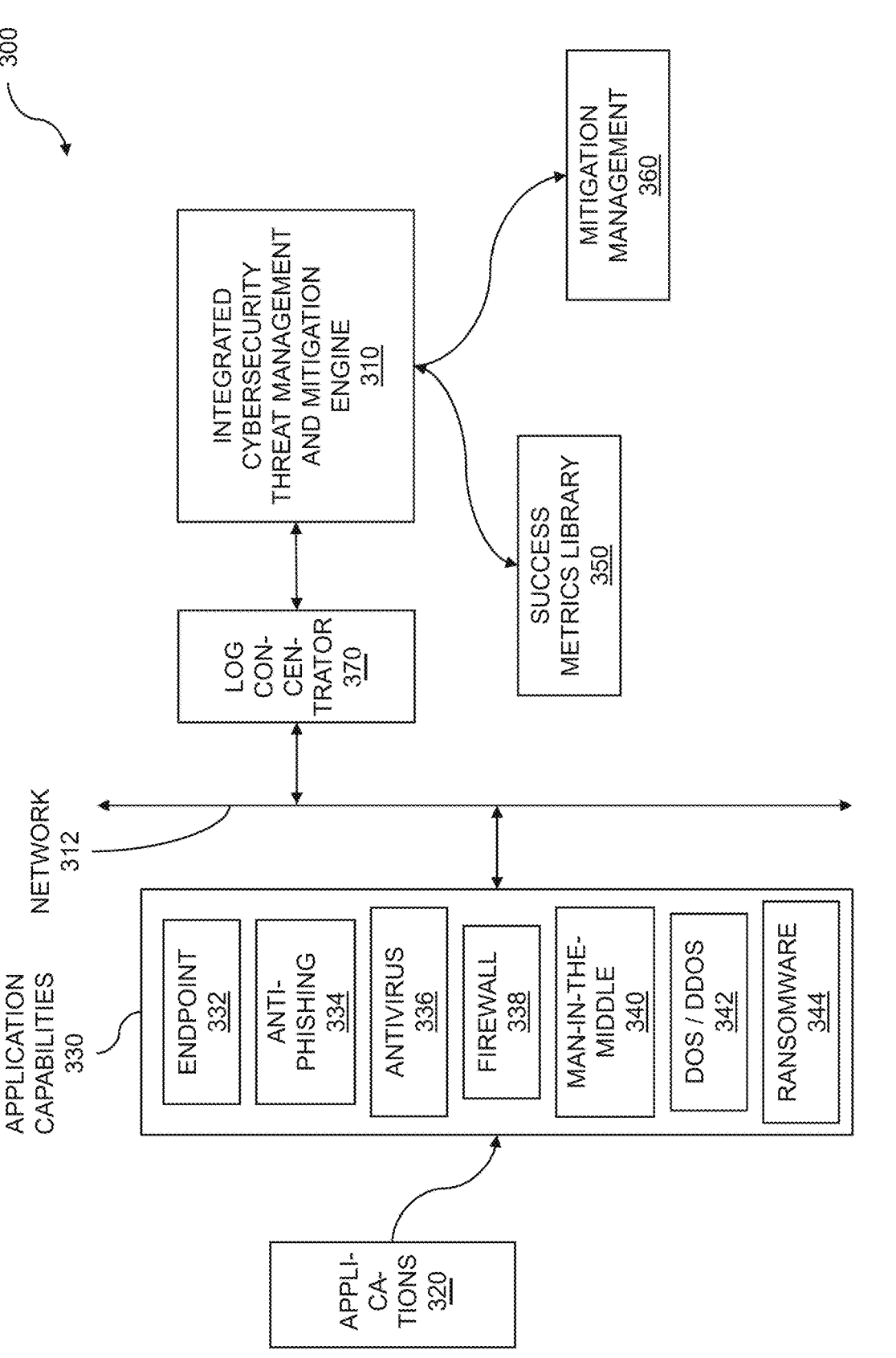
FIG. 3 is a system block diagram for cybersecurity mitigation management.

FIG. 3 is a system block diagram 300 for cybersecurity operations mitigation management. Cybersecurity operations center load balancing can be implemented based on workflow management, where the workflow management uses a supervisory workflow element. The supervisory workflow element enables cybersecurity management of cybersecurity operations. Threat management such as cybersecurity threat management includes detecting new cybersecurity threats and assigning those threats to one or more analysts for action. In an example threat management scenario, an analyst to whom a new cybersecurity threat can be assigned can be selected for the assignment based on an analyst threat response profile. The threat response profile is produced by analyzing results from a security operations center caseload history. The profile can include analyst qualifications, certifications, training, experience, success rate, and so on. The profile can be augmented with threat response resolution metrics such as an initial response time, a closure response time, and a peer interaction metric. The selected analyst may not be available to handle the new cybersecurity threat because of a caseload that is already "heavy" or full. To make the analyst available to handle the new cybersecurity threat, one or more cases within the analyst's caseload can be reassigned to one or more other analysts, thereby freeing the analyst to handle the new cybersecurity threat. Cybersecurity management is accomplished by a cybersecurity mitigation management system 360. The mitigation management system is part of a SOAR. A plurality of network-connected cybersecurity threat protection applications is accessed. A plurality of inputs is received from the cybersecurity threat protection applications, wherein the plurality of inputs is initiated by one or more cybersecurity events. A computer platform is used to analyze metadata associated with the plurality of inputs from the cybersecurity threat protection applications. A cybersecurity threat response is generated, based on the groupings.

An example system block diagram for threat management is shown. Threat management such as cybersecurity threat management is critical to an organization. The cybersecurity threat management is used to monitor operations such as data operations within the organization. When anomalies or outright threats are detected, threat management applies a variety of techniques to determine the cause of an anomaly, a source of a threat, and responses to the anomalies and threats. The system block diagram 300 can include an integrated cybersecurity threat management engine 310. The management engine can access applications; collect and ingest log files from the applications; sort, integrate, and evaluate threat protection elements; and so on. The engine can include one or more processors, processor cores within integrated circuits or chips, CPUs, GPUs, and so on. The management engine can be coupled to a network 312 such as a computer network. The network can be based on wired and wireless communications techniques.

The system block diagram 300 includes a plurality of applications 320. The applications can include network-connected cybersecurity threat protection applications. The applications can perform tasks such as network and processor monitoring; data integrity monitoring; data, services, and physical access control; etc. Some applications within the plurality of threat protection applications can perform unique tasks, can perform similar or redundant tasks, and the like. The applications within the plurality of cybersecurity threat protection applications can include application capabilities 330. The application capabilities can include endpoint protection 332. Endpoint protection can include authentication and supervision of "endpoint" devices. The endpoint devices can include desktop computers, laptop computers, tablet computers, personal electronic devices such as smartphones and PDAs, and so on. Endpoint protection can include enabling access of the endpoint devices based on one or more rights. Access rights can include creating, editing, and deleting files, folders, and so on. Access rights can include read-write, read-only, write-only (e.g., a drop box), etc. Endpoint protection can restrict access, impose security rules, and the like.

Application capabilities can include anti-phishing 334 techniques. "Phishing" threats can be based on sending fraudulent email messages, where the messages appear to be from a legitimate sender who may be known to the recipient. The messages are used to gather sensitive, identifying information about an individual which is then used to defraud the individual. The application capabilities can include antivirus 336 techniques. Antivirus techniques can be used to detect viruses that can be embedded in data such as images, audio files, and so on. The application capabilities can include firewall 338 techniques. Firewall techniques can be used to block network traffic, applications, etc. that can attempt to penetrate a network and IT infrastructure using one or more network ports and communications protocols. The application capabilities can include man-in-the-middle detection and prevention techniques 340. A "man-in-the-middle" cybersecurity threat includes interception of communications between a user or endpoint device and an entity with which the user or endpoint device is trying to communicate. The communications interception attempts to extract personal or identifying information from the communications for fraudulent purposes. The application capabilities can include denial of service (DOS) and distributed denial of service (DDOS) 342 detection techniques. Denial of service attacks attempt to render a website, computer, processor, and so on unreachable or unusable by overwhelming it with requests. The application capabilities can include ransomware 344 detection techniques. Ransomware attacks encrypt a victim's data. The encrypted data is only decrypted, if at all, after payment of a ransom.

The system block diagram 300 includes one or more mitigation responses generated by the integrated cybersecurity threat management and mitigation engine 310. The generated responses can be provided to a cybersecurity mitigation management entity 360. A cybersecurity mitigation management entity can include a human-based entity, a machine-based entity, or a combination of human-based and machine-based entities. In embodiments, the cybersecurity mitigation management entity can be a cybersecurity professional. The cybersecurity professional can be an employee of an organization, a consultant to the organization, and so on. In other embodiments, the cybersecurity threat management entity can be a security orchestration, automation, and response (SOAR) application. The SOAR application can handle threat detection, response generation, case tracking, and so on. The system block diagram can include a log concentrator 370. The log concentrator can sort a plurality of log files, can integrate the log files, and so on. The concentrator can extract key information from the log files. The concentrator can compress log file data.

The system block diagram 300 includes a library of cybersecurity mitigation success metrics 350. In embodiments, the success metrics comprise cybersecurity validators, including success criteria and a time factor. The time factor includes a number of days post-mitigation initiation. The library of cybersecurity mitigation success metrics can be used to validate a cybersecurity mitigation event based on achieving one or more of the cybersecurity mitigation success metrics. For example, success metrics related to a cybersecurity virus attack on a group of users can include the time it takes system administrators to acknowledge and respond to an anti-virus alert, the amount of time required to refresh or rebuild infected workstations, the number of workstations impacted, the version of anti-virus software and signature libraries running on infected workstations, the amount of time required to disconnect infected workstations from the network, and so on. These metrics can be used by the SOAR system to compare cybersecurity events to successful event metrics from previous occasions. For example, one success metric stored in the library can state that the time from initial detection of a suspect file on a user station to a response by a cybersecurity administrator should be eight minutes or less. In many virus or malware events, anti-virus software running on a workstation can detect a potential problem with a file, flag it, warn the user, and take initial steps to isolate the file within a few seconds. At the same time, an alert is sent to an anti-virus management system that can be part of a larger SOAR system. Once the SOAR management system receives the alert, further mitigation steps taken by a human administrator or a machine learning model should begin mitigation. In this example, a successful mitigation response from the SOAR system to a malware or virus attack on a user workstation should occur in eight minutes or less after the initial detection of a problem on a workstation. As the event progresses, additional metrics can be collected and compared to metrics in the success metric library. This can include, for example, comparing the version of the antivirus software and the virus signature library running on the infected workstation to the most current versions available from the software vendor, checking the steps taken by human administrators against a best-practice list of mitigation steps, and so on. In a broader attack involving multiple workstations, the amount of time required to update all related workstations with mitigating software patches can be compared to an optimal time for the same number of workstations, or the time per workstation or network node as recorded in the success library. In a more proactive mode, the amount of time between the release of a software upgrade from a cybersecurity vendor to its deployment to appropriate workstations in a network can be compared to published best practice times or internal standards set by management. As cybersecurity events occur, the comparisons actual tasks and times to success metrics can be used to validate the mitigation process 220 described previously, to identify areas to be improved, and to highlight people and processes that are working well.

A plurality of cybersecurity threat protection applications 320 can be accessed. The cybersecurity threat protection applications can be network connected and managed by a network-connected computer platform running an integrated cybersecurity threat management and mitigation engine 310. The applications can include antivirus, anti-phishing, distributed denial of service (DDoS), intrusion detection, and other applications. The access to the applications can be enabled by the integrated cybersecurity threat and mitigation management engine. The applications can reside with IT infrastructure operated by an organization, can be provided as a cloud service, etc. Inputs can be received from the cybersecurity threat protection applications. The inputs can be initiated by one or more cybersecurity events. In embodiments, the inputs can be received by a microservice. Discussed previously, the SOAR application microservice can handle threat detection, response generation, case tracking, and so on. The inputs from cybersecurity threat protection applications can be fed to the mitigation management system 360 and compared to metrics from the success metrics library 350. As cybersecurity events progress, threat protection application logs and other responses can be concentrated and standardized by the log concentrator 370 and can be used as input to the SOAR integrated cybersecurity threat management and mitigation engine 310 and the success metrics library 350.

In embodiments, cybersecurity threat events can generate multiple inputs from the plurality of threat protection applications 320 with multiple application capabilities 330. The inputs from the applications can be fed into a log concentrator 370 that can normalize the inputs, place them in time sequence, and forward them to the integrated cybersecurity threat management and mitigation engine 310. The threat management and mitigation engine 310 can route the application inputs to a mitigation management system 360 and to a success metrics library 350. The mitigation management system 360 can use the application inputs to track ongoing mitigation responses and statuses of various components and applications involved in a cybersecurity threat event, and can compare timings and other parameters of the application responses to metrics from the success metrics library 350. The application inputs can also be recorded by the success metrics library 350 to update the library as new events and mitigation steps are employed by the mitigation management system 360 and human cybersecurity professionals.

Figure 4:
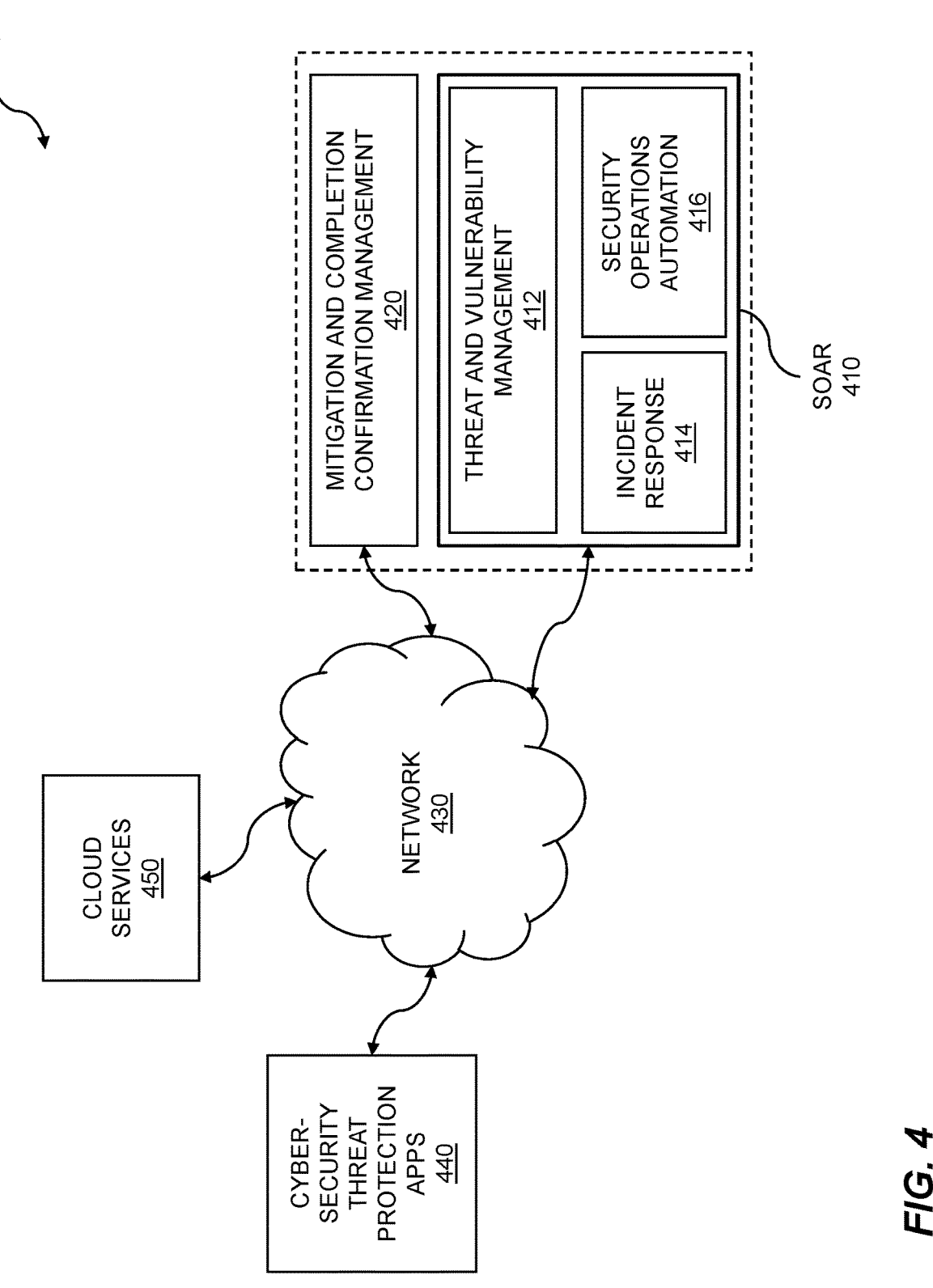
FIG. 4 illustrates a network-connected security orchestration, automation, and response (SOAR) system.

FIG. 4 illustrates 400 a network-connected security orchestration, automation, and response (SOAR) system. Discussed above and throughout, cybersecurity threats can occur as often as every few seconds. These threats target individual users, businesses, universities, hospitals, government agencies, and so on. The cybersecurity threats constitute extreme menaces, and indeed existential crises, to the enterprises. Cybersecurity threat management includes identifying that a threat is underway, what IT infrastructure and data are under attack, the type of threat, etc. The cybersecurity threat management ideally then proceeds to block and remove the threat, isolate affected infrastructure, perform eradication or remediation, and the like. Cybersecurity management is enabled by cybersecurity mitigation and completion confirmation management along with threat and vulnerability management. A plurality of network-connected cybersecurity threat protection applications is accessed. A plurality of inputs is received from the cybersecurity threat protection applications, wherein the plurality of inputs is initiated by one or more cybersecurity events. A network-connected computer platform is used to analyze the plurality of inputs and the metadata associated with the plurality of inputs from the cybersecurity threat protection applications. The inputs are analyzed by the threat and vulnerability management element. A cybersecurity threat mitigation plan is generated based on the analysis. A mitigation management system oversees deployment of the mitigation steps, tracks progress, and compares mitigation results and timing to a library of mitigation success metrics. The mitigation and completion management system updates the library of success metrics and reports on the threat mitigation responses to cybersecurity management.

A cloud-connected security orchestration, automation, and response (SOAR) system is illustrated 400. The SOAR can comprise a cybersecurity component such as 410, where the SOAR can be based on one or more cybersecurity threat protection applications, tools, techniques, and so on. The SOAR can enable data collection from a wide range of data sources such as threat data sources. The threat data sources can include data uploaded by cybersecurity experts, data produced by cybersecurity threat protection applications, and so on. The SOAR can be used to manage threat protection processes, anti-threat technologies, and human expertise. The SOAR can centralize management of IT assets such as networks, processors, data storage elements, etc. on a network-connected computer platform. The SOAR can provide threat alerts and can also provide contexts for the alerts. The SOAR can further automate responses to threats, adapt the responses using machine learning, and so on. The SOAR can use a library of cybersecurity mitigation success metrics to compare timing and effectiveness of mitigation steps to previous events and successful mitigation processes.

The SOAR 410 can include one or more components associated with cybersecurity threat management. The SOAR can include a threat and vulnerability management component 412. The threat and vulnerability management component can configure and control IT infrastructure elements such as routers, switches, processors, storage area networks (SANs), and so on. The SOAR can include an incident response component 414. The incident response component can provide alerts, can trigger one or more actionable responses, and the like. In embodiments, the actionable response can enable scalability of a connected SOAR system. The SOAR can be scaled up to address many threats, to reduce threat response time, etc. In embodiments, the actionable response can include a recommendation for a cybersecurity professional. The recommendation can include a recommendation for a threat response policy, a source for further information about the threat, etc. In further embodiments, the actionable response can include an autonomic network reconfiguration. An autonomic network reconfiguration can include isolating IT elements, restricting IT elements, and the like. In embodiments, the actionable response can include an autonomic cybersecurity threat protection application reconfiguration. The threat protection application reconfiguration can include isolating, reinstalling, reconfiguring, or rebooting an application. The threat protection application reconfiguration can include synchronizing operation of two or more threat protection applications.

The SOAR can include security operations automation 416. Security operations management can include automatically securing IT infrastructure elements such as switches, routers, processors, storage elements, etc., where the securing can be based on a procedure, a policy, and so on. The security operations automation can include updating IT element software and firmware, installing and configuring security software such as antivirus software, and the like. Cybersecurity threat application inputs can include alerts, text or SMS messages, email, a rendering on a graphical display, and so on. The analysis can be based on metadata associated with the plurality of inputs from the cybersecurity threat protection applications. Discussed above and throughout, the metadata can include a variety of status and other information such as a time and a frequency of cybersecurity threat protection application inputs, one or more techniques used to receive the application inputs, who or what tool provided the application inputs, etc. The mitigation response can include a workflow that can be developed to address, rectify, remediate, prevent, etc. the cybersecurity threat. The cybersecurity threat response can address various types of events such as a zero-day event. The SOAR can be associated with a mitigation and completion confirmation management element 420. The mitigation and completion confirmation management element can coordinate mitigation steps generated by cybersecurity threat applications, record timing and effectiveness, compare mitigation steps to previous incidents, and report on mitigation step completions as they occur, to name just a few.

The SOAR can use a network 430 to access a plurality of cybersecurity threat protection applications 440. The network can include a wired network, a wireless network, a hybrid wireless/wireless network, and so on. The network can be based on wired networking standards such as Ethernet™ (IEEE 802.3), wireless networking standards such as Wi-Fi™ (IEEE 802.11), and so on. The cybersecurity threat protection applications can provide capabilities such as endpoint protection, anti-phishing, antivirus, firewalls, and so on. The cybersecurity threat protection applications can further detect and protect against man-in-the middle ruses, denial of service (DOS) and distributed denial of service (DDOS) attacks, ransomware, and the like. In embodiments, the background synchronization service can communicate to the plurality of network-connected cybersecurity threat protection applications using cloud services 450. The cloud services can provide access and can also provide IT services such as software as a service (SaaS), platform as a service (PaaS), infrastructure as a service (IaaS), and so on.

Figure 5A:
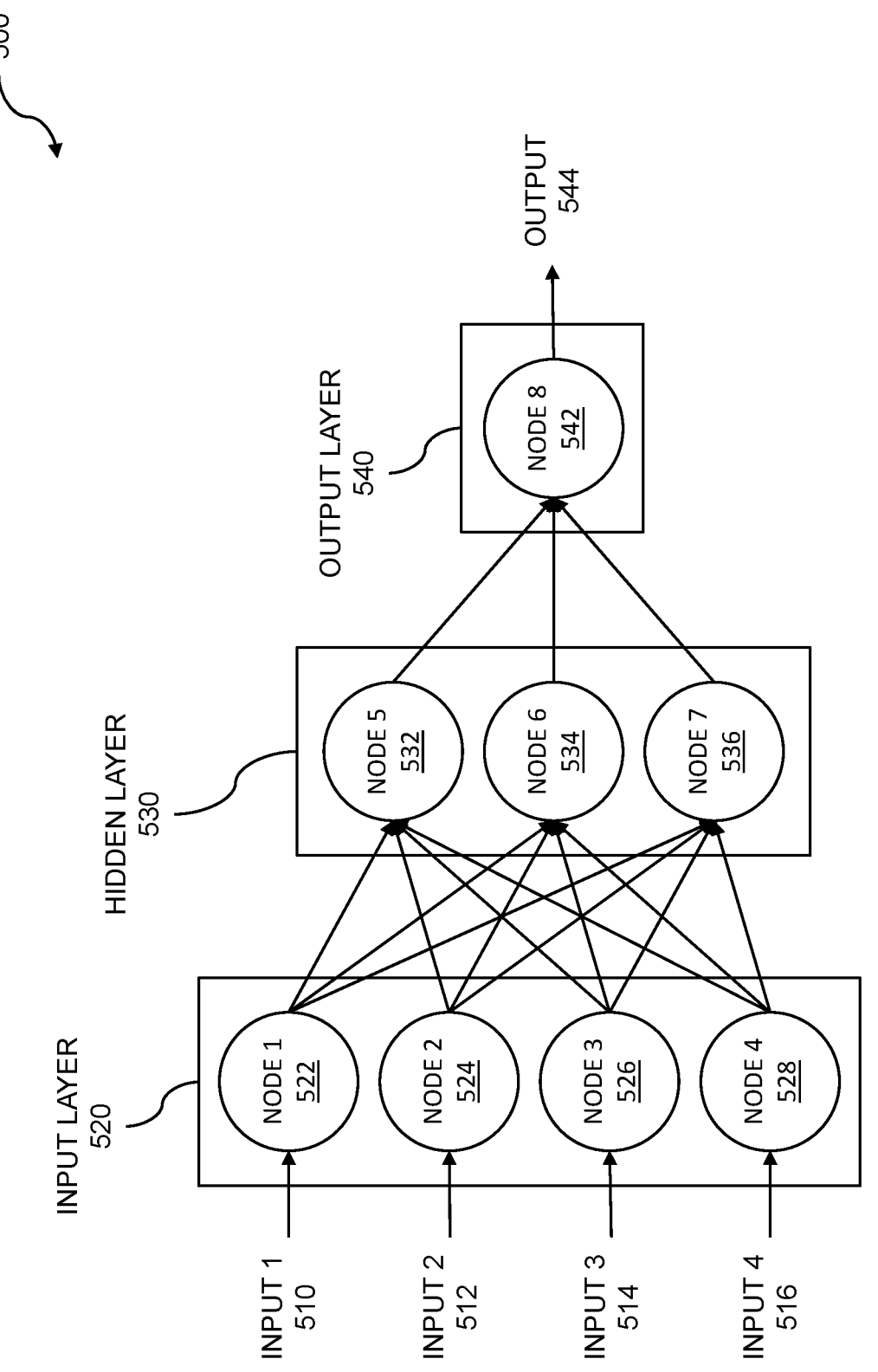
FIG. 5A shows an example neural network for machine learning.

FIG. 5A shows an example neural network for machine learning. The neural network for machine learning can be based on a variety of neural network types such as a convolutional neural network (CNN), a deep neural network (DNN), a recurrent neural network (RNN), and so on. The neural network for machine learning comprises a plurality of layers, where the layers can include one or more of an input layer, an output layer, a convolutional layer, a bottleneck layer, an activation layer, and the like. The bottleneck layer, if present within the neural network, can be used for neural network training. The trained neural network can be applied to cybersecurity operations tasks such as cybersecurity operations case triage groupings. A neural network for machine learning can apply classifiers. The classifiers can be learned based on one or more inputs from a plurality of network-connected cybersecurity threat protection applications. A plurality of network-connected cybersecurity threat protection applications is accessed. A plurality of inputs is received from the cybersecurity threat protection applications, wherein the plurality of inputs is initiated by one or more cybersecurity events. A computer platform is used to analyze metadata associated with the plurality of inputs from the cybersecurity threat protection applications. The inputs are triaged into groupings, based on the metadata. A cybersecurity threat response is generated, based on the groupings.

The example 500 shows a neural network for machine learning. The neural network includes one or more layers such as input layers, hidden layers, and output layers. Layers, such as convolutional layers, activation layers, bottleneck layers, etc. that perform operations associated with applications such as machine learning can also be included within the example neural network. Data can be provided to the neural network though inputs such as input 1 510, input 2 512, input 3 514, and input 4 516. While four inputs are shown, other numbers of inputs can also be applied to the neural network. The data can include training data, production data, etc. The data is provided to an input layer 520 of the neural network. The input layer comprises one or more nodes such as node 1 522, node 2 524, node 3 526, and node 4 528. While four nodes are shown within the input layer, other numbers of nodes can be included. One or more weights (explained below) can also be provided to each node within the input layer. The outputs of the nodes associated with the input layer can be coupled to inputs of nodes associated with a hidden layer such as hidden layer 530. The hidden layer can comprise one or more nodes such as node 5 532, node 6 534, and node 7 536. While three nodes are shown, other numbers of nodes can be included in the hidden layer. In the example neural network, each output of the nodes associated with the input layer is coupled to each input of the nodes associated with the hidden layer. The coupling of each node output to each node input accomplishes a fully connected (FC) layer within the neural network.

The example neural network can include one or more hidden layers. The hidden layers can include substantially similar or substantially dissimilar numbers of nodes. The hidden layers can be fully connected layers as just described, convolutional layers where a subset of outputs is connected to a subset of inputs, bottleneck layers, activation layers, etc. The example neural network includes an output layer 540. The output layer can include one or more nodes such as node 8 542. While one node is shown within the output layer, the output layer can include more than one node. The output layer produces an output 544. The output can include a value, a probability, and so on.

Figure 5B:
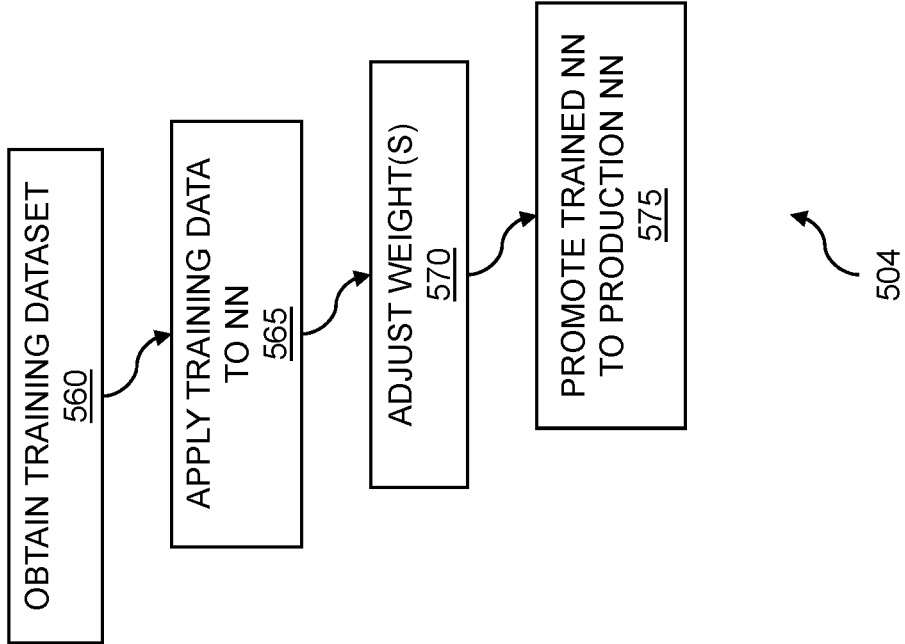
FIG. 5B shows training a neural network for machine learning.
Figure 5B:
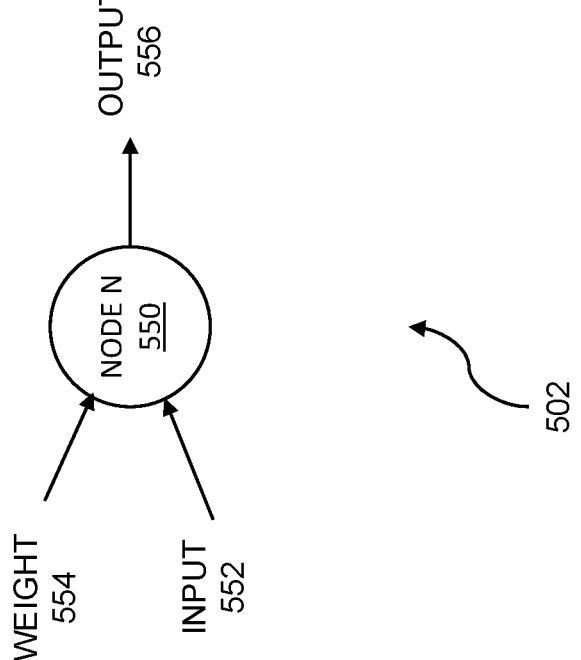

FIG. 5B shows training a neural network for machine learning. Discussed previously, a neural network comprises layers of nodes or neurons such as artificial neuron 502. The artificial neuron can be configured to process input data in order to produce output data. An example node 550 is shown. A neuron can be coupled to one or more signals or inputs such as input 552, and one or more weights such as weight 554. The node multiplies each input by its corresponding weight and maintains a running sum of the resulting products. The output of the node, such as output 556, can be calculated by applying a function such as a transfer function to the sum of products of the inputs and weights. The transfer function can include various types of functions such as a unit step or threshold function, a sigmoid, a Gaussian function, a piece-wise linear function, and so on.

Each neuron within a neural network can be trained. The training can be based on using a dataset that includes known data. The training can be further based on comparing results of data processing by the neural network with expected results associated with the known data. The expected results include results of neural network processing of the dataset of known data. One or more weights associated with each node are adjusted until the neural network can form an inference that produces the expected result. In a usage example, a dataset of images of dogs or cats can be used to train a neural network to identify dogs or cats within images not included in the training data set. A flow for neural network training is shown. The neural network training can include training a neural network for machine learning applications. The flow 504 includes obtaining 560 a training dataset. The training dataset can include cybersecurity operations center caseload histories, resolutions to cybersecurity threats, and so on. The training dataset can include threat response resolution metrics. The training dataset can further include one or more objective ratings, where the objective ratings can be used to update the threat response resolution metrics. Further, a subjective rating can include a management-supplied rating, a peer-supplied rating, a machine-learning-supplied rating, etc.

The flow 504 includes applying 565 the training data to a neural network. The training data is provided to the inputs of the neural network and the neural network proceeds to process the test data. The flow 504 includes adjusting one or more weights 570 associated with the nodes of the neural network. The adjusting the weights can enable enhanced convergence by the neural network to an expected result. The enhanced convergence can reduce neural network processing time, improve inference accuracy, etc. The adjusting the weights can include an iterative process. The adjusting weights associated with the nodes within the neural network can become more accurate as further training data is provided. The flow 504 includes promoting the trained neural network 575 to a production neural network. The production neural network can be used to process data such as a security operations center (SOC) caseload history. The production neural network can continue to adapt or learn based on processing further data. The learning can include further adjustment to one or more weights associated with nodes within the neural network. In embodiments, the accessing, the analyzing, the augmenting, the receiving, and the assigning, all of which are discussed previously, can be converted to machine learning training data. The machine learning training data that was converted can be used to further train or adjust the machine learning neural network.

Figure 6:
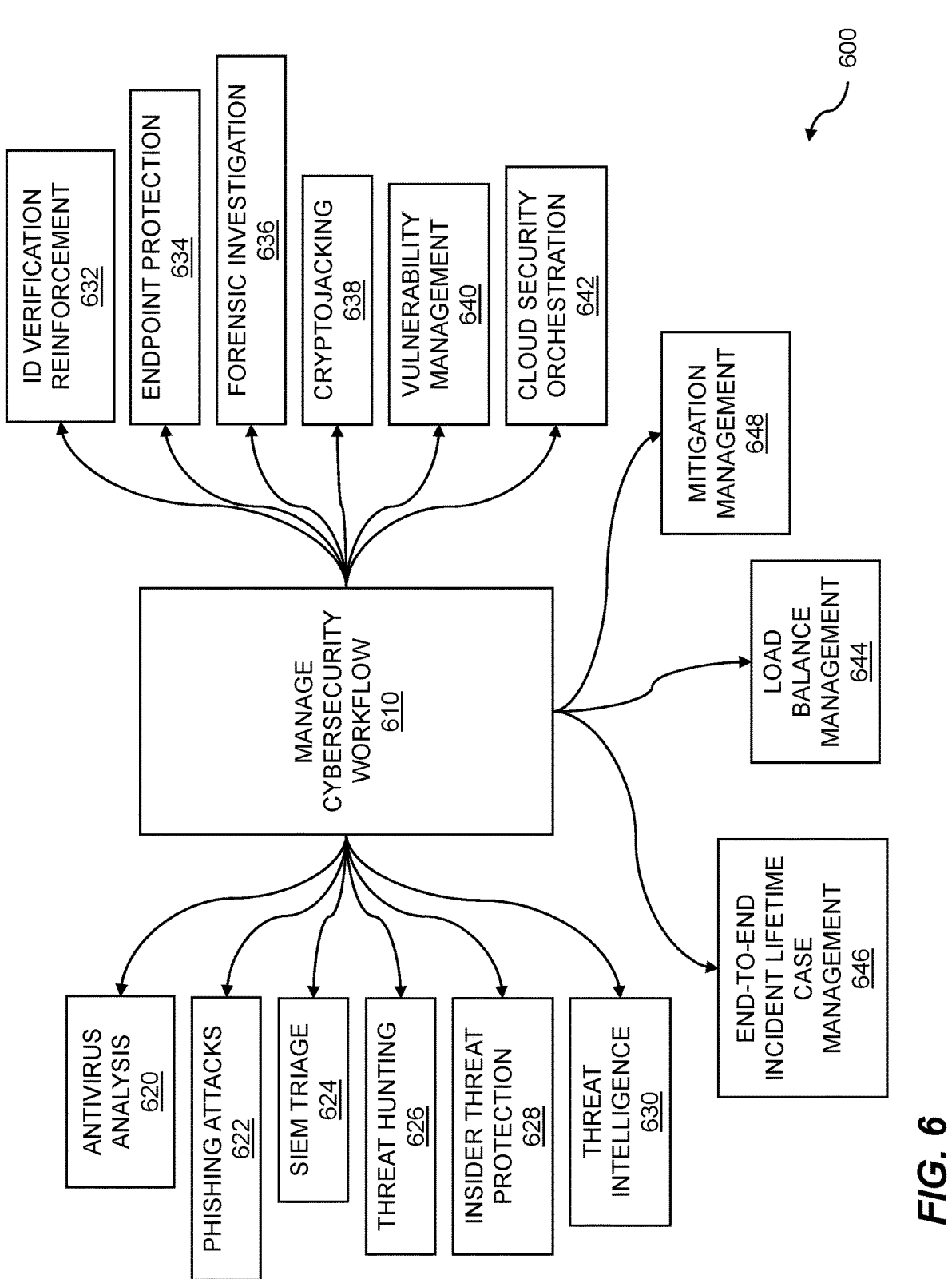
FIG. 6 is an infographic for cybersecurity workflow management.

FIG. 6 is an infographic for cybersecurity workflow management. Information technology (IT) infrastructure comprises computing devices, storage devices, networks, perhaps personal devices, operating systems, cloud-based systems, and so on. Whether these IT elements are operated by an individual for personal use or by an organization in support of operations, all of the IT elements are nearly constant targets of malicious attacks from outside an organization. Worse yet, some of the attacks originate from within an organization. A plurality of network-connected cybersecurity threat protection applications is accessed. A plurality of inputs is received from the cybersecurity threat protection applications, wherein the plurality of inputs is initiated by one or more cybersecurity events. A computer platform is used to analyze metadata associated with the plurality of inputs from the cybersecurity threat protection applications. The inputs are analyzed by a threat and mitigation management system. A cybersecurity threat mitigation response is generated, deployed, tracked, and compared to previous mitigation responses. The completion of mitigation events is stored and reported on to cybersecurity administrators and managers.

The diagram 600 includes cybersecurity management 610. Cybersecurity management can include prioritizing a variety of IT techniques for identifying threat risks, correcting identified risks, counteracting active threats, and so on. Cybersecurity management can be based on accessing a range of applications (discussed below) which can include antivirus software, access control, data encryption, network channel encryption, and the like. In embodiments, cybersecurity includes managing the plurality of threat protection applications for a data network. The techniques that can be used for cybersecurity management can be based on one or more workflows. The workflows, which can include cybersecurity tasks and commands, can automate various tasks associated with cybersecurity management. In embodiments, the managing cybersecurity can include graphical control of the plurality of cybersecurity threat protection applications. The graphical control can enable dragging and dropping of tasks, commands, and so on into a workflow. In other embodiments, the automation workflows can support dynamic swapping of cybersecurity threat protection applications. The workflows can support swapping-in or swapping-out one or more threat protection applications. The swapping-in and the swapping-out are enabled by a universal data layer (UDL). The UDL enables applications to be swapped without having to edit a workflow or create a new workflow to address the swapped-in application.

The diagram 600 includes antivirus analysis 620. Antivirus analysis can include virus detection, Trojan horse program detection, and so on. The analysis can include determining a source or vector of a virus, the actions taken by the virus, how to counter actions taken by the virus, to whom the virus might be in communication, etc. The antivirus analysis can be used to determine changes or updates to the virus, and how to better detect the virus before it can be deployed. The diagram 600 can include analysis of phishing attacks 622. Phishing is a form of attack that attempts to fraudulently obtain personal, sensitive, or private data and information. The data or information that is sought by a phishing attack can include personal information such as name, address, date of birth, telephone number, email address, and so on. The information can further include government-related information such as social security numbers, tax records, military service information, etc. The information can also include usernames and passwords to sensitive websites such as banks, brokerages, hospitals and health care providers, and the like. A phishing attack can purport to be from an entity known to a user by presenting the user with a legitimate looking webpage. However, links on the fraudulent page do not take the user to the legitimate site, but rather to a site designed to steal the victim's data.

The diagram 600 includes security information and event management (SIEM) triage 624. SIEM, which combines the management of security information and security events, can provide analysis of security alerts, alarms, warnings, etc. in real time. The alerts that are analyzed can be generated by one or more of the plurality of cybersecurity threat protection applications, by network security hardware, and so on. The triage can be used to determine the severity of an alert, the scale or extent of the alert, the urgency of the alert, and the like. The diagram 600 includes threat hunting 626. Threat hunting can include techniques used to locate cybersecurity threats within a network, where the threats can elude detection using more common threat detection techniques. Threat hunting can include iteratively searching network-connected devices throughout a data network. Threat hunting can be used in addition to common cybersecurity techniques including firewalls for port blocking, intrusion detection, etc. The diagram 600 includes insider threat protection 628. Insider threats are among the most difficult threats to counter because they are perpetrated by people who have knowledge of the security techniques implemented by an organization. An insider threat attack can include physical damage to computing, data, and network systems; data breaches; and the like. Insider threats can result from overly permissive access to sensitive areas or data, lax firewall policies, etc. An insider attack can include moving sensitive data to another device within the organization—a lateral transfer.

The diagram 600 includes threat intelligence 630. Threat intelligence can include information associated with cybersecurity threats, used by an organization. The threat intelligence information can be associated with past security threats, current security threats, and threats likely to arise in the future. The information can be used by the organization to identify cybersecurity threats, to prevent the threats, and to prepare for inevitable threats that are likely to emerge in the future. The diagram 600 includes identity verification reinforcement 632. Identity verification can include techniques to verify that a person who has access to computing systems, data systems, networks, and so on that are associated with an enterprise, is in fact a real person. Identity verification can be based on physical documents such as a government issued identification documents. The diagram 600 can include endpoint protection 634. In a typical enterprise computing environment, individuals may try to use personal electronic devices to access the enterprise network. Such devices can include laptop computers, tablets, PDAS, smartphones, and the like. Such devices can pose a serious threat to an enterprise network because of operating systems which may not be updated, questionable applications which may be installed on the devices, etc. Endpoint protection can require that any device, including personal electronic devices, meets certain standards prior to connection to the enterprise network. The standards can include approved devices, operating systems, applications, antivirus applications, virtual private network apps, etc.

The diagram 600 includes forensic investigation 636. Digital forensic investigation can include data recovery, data maintenance, and investigation of data and information that can be found on various digital devices. Digital forensic techniques can be applied for investigation of a variety of digital malfeasances including cybercrime. Forensic investigation techniques can be used to determine, track, and locate perpetrators of cybercrime. The diagram 600 includes the detection of cryptojacking 638. Cryptojacking can include hijacking of computers, servers, personal electronic devices, and so on for the purposes of mining cryptocurrency. The diagram 600 includes vulnerability management 640. Vulnerability management seeks to reduce risks to computing systems, data systems, networks, and so on by identifying, evaluating, correcting, and communicating vulnerabilities associated with the computing systems and the applications that are executed on the computing systems. The diagram 600 includes cloud security orchestration 642. Many individuals, and organizations such as businesses, hospitals, universities, and government agencies, use cloud services for processing, data storage, and other IT services. Cloud orchestration can manage relationships, interactions, and communications among computational workloads. The computational workloads can be associated with public cloud infrastructure and private cloud infrastructure. Cloud security orchestration can include imposing permissions and access oversight, and policy enforcement.

The diagram 600 includes load balance management 644. The load balance management can balance and adjust assignment of cybersecurity threats to one or more analysts. The load balance management attempts to assign a cybersecurity threat to a specific analyst who is best suited to handling and addressing the cybersecurity threat. If the caseload associated with the analyst is "heavy" or "full", then one or more cases assigned to that analyst can be reassigned to one or more other analysts. In embodiments, the reassigning can include a re-triage of an existing SOC caseload. The re-triage results can be used to reassign one or more analysts determined to be capable of handling the cybersecurity threat. The diagram 600 includes end-to-end incident lifetime case management 646. An incident can include a virus outbreak, a distributed denial of service (DDOS) attack, and the like. Incident lifetime management can include identifying that an incident has occurred, notifying that the incident has occurred and escalating response to the incident, investigating and diagnosing the incident, resolving the incident, and recovering from the incident. Incident lifetime management can further include closing the incident. The diagram 600 includes mitigation management 648. The mitigation management can coordinate actions taken by cybersecurity threat protection applications and security analysts as they are implemented. The timing and effectiveness of the mitigation steps can be tracked and compared to a library of cybersecurity mitigation success metrics. The results can be reported to cybersecurity managers and machine learning models to improve responses and identify possible weak points in network security.

The components and processing flow depicted as part of diagram 600 (as well as the systems, components, and processes depicted throughout this document) can be implemented as part of any of a variety of cybersecurity solutions to assist with risk mitigation, management, and resolution, such as being implemented as part of a managed risk solution (e.g., the ARCTIC WOLF MANAGED RISK solution) and/or as part of a managed detection and response solution (e.g., ARCTIC WOLF MANAGED DETECTION AND RESPONSE).). Managed risk solutions can allow entities to define and contextualize their attack surface coverage across networks, endpoints, and cloud environments; to prioritize risks within their network environment; and can identify and apply remediation actions to ensure that configurations are applying current best practices and continually hardening their security posture. Managed detection and response solutions can provide active monitoring of networks, endpoints, and cloud environments to help detect, respond to, and recover from cybersecurity attacks.

A managed risk solution can include a variety of components and processes, such as identifying assets within a network environment and defining potential attack surfaces across the network, perimeter, host, and/or accounts. The attack potential surfaces can be contextualized with corresponding risk policies, asset criticalities, and/or service level objectives to protect a network environment to against cyber risk. With attack surfaces contextualized, risk priorities within the network environment can be determined and remediation actions can be performed to bring the network environment up to at least a minimum threshold standard of preparedness for current cybersecurity risks (i.e., bring network environment configuration up to current best practices standard) and to continually harden the security posture for the network security environment. Such remediation actions can additionally provide a benchmark against which the network environment configuration, risks, and performance against attack vectors can be evaluated.

Such managed risk solutions, which can incorporate security operations workflows and comprehensive digital risk element evaluations, can provide quantified, real-time understanding of cybersecurity risks within a network environment, which provide for taking prioritized action to improve cybersecurity risk postures. For example, managed risk solutions can provide for identification and protection against digital cybersecurity risks to prevent attacks before they occur by limiting the attack surface.

Managed risk solutions can be implemented in any of a variety of ways and can include any of a variety of components and processes, such as through one or more of: network vulnerability scanning, internal vulnerability assessments, external vulnerability assessments, host-based vulnerability assessments, contextualized attack surface coverage, security controls benchmarking, account takeover risk assessments, cloud security posture management, and security analyst teams. Network vulnerability scanning can include scanning for vulnerabilities across internal networks, external networks, and host-based systems. Internal vulnerability assessments can include continuously scanning some or all internal IP-connected devices, cataloging network core infrastructure, equipment/peripherals, workstations, and Internet of things (IoT) and personal (i.e., tablets) devices. External vulnerability assessments can include continuously scanning internet-facing servers to understand an entity's digital footprint and quantify risk/exposure outside of their internal network environment. Host-based vulnerability assessments can extend vulnerability scanning inside workstations and servers through continuous host-based monitoring to reveal threats and user behavior that put an entity and its network environment at risk. Contextualized attack surface coverage can include contextualizing attack surface coverages with risk policies, asset criticalities, and SLOs (service level objectives), which can be done by asset criticality determinations and asset tagging. Security control benchmarking can include agent-based security configuration benchmark scans to reveal gaps in system configurations that can drift over time and identify digital risks beyond vulnerability assessments. Account takeover risk assessments can include monitoring the dark web and other private network sources for evidence of sensitive information, such as usernames and passwords, being exposed and can generate alerts before they can be used in a cybersecurity attack. Cloud security posture management can include monitoring cloud infrastructure for common misconfigurations in a network environment that can create potential cybersecurity vulnerabilities that could be exploited by malicious actors. Cybersecurity analyst teams can include teams of analysts specifically trained to monitors for risk on an ongoing basis through the use of automated cybersecurity monitoring, detection, and mitigation systems, and can additionally perform regular security posture reviews to advise on potentially new vulnerabilities, configurations to fix, and corresponding risk-based prioritization. Managed risk solutions can include additional and/or alternate components and processes, as well.

Managed risk solutions can be provided in phases, such as a deployment phase, a configuration review phase, and an active vulnerability management cycle. Deployment can include installation and integration of scanning technologies within a network environment. Configuration review can include contextualization of assets and security operations to identify and assess risks, determine risk prioritizations, and to develop plans to mitigate risks. Active vulnerability management cycles can include ongoing vulnerability management using the determinations and plans developed during the configuration review. Configuration review can be updated on a recurring basis and fed back into the active vulnerability management cycle.

Manage risk solutions can use any of a variety of determinations, such as risk scores, to track performance of a managed risk solution for a network environment over time, and to track performance against other network environments, such as competitor or other industry network environments. For example, an overall risk score can be determined for a network environment that assesses the current level of risk posed by the network environments configurations. The risk score can, for example, quantify an organization's current risk score measured by business impact and issue severity. The risk score can be used to determine and present risk score trends, such as a timeline showing how an organization's risk posture has changed over time, including with relative comparisons to one or more industry risk scores and/or one or more desired target risk scores. Such risk score information, including the number of potential network vulnerabilities, can be additionally broken down by asset classes, such as desktop, server, mobile, workstation, and others. An industry risk score can combine the risk score of peers within an industry, such as an average, median, or mathematical operation combining risk scores for others in the industry. Mappings of network health against domain assets (e.g., domain/IP address, device), can also be provided, such as through visual network health heatmaps showing measure network health, such as through issue severity, against network assets, such as domain/IP addresses, that are affected. Such information can be provided in one or more user interfaces that can be used by network analysts, such as a managed risk dashboard.

Managed detection and response solutions can include a variety of components that are configured to perform detection operations, response operations, and recovery operations. Detection operations can be integrated into existing technology stacks to discover and profile assets, and to collect data and security events observations from multiple sources. Detection operations can additionally include persistent and continuous monitoring of threats within a network environment, including advanced threat detection through monitoring and analysis of broader security data for a network environment. Response operations can include managed investigations that avoid an overabundance of alerts and false positives, rapid incident response to critical security incidents, and log retention and search that permits for ready additional investigations, as warranted. Recovery operations can include guided remediation to assist in validating and neutralizing threats, and verification that remediated threats do not reemerge. Recover operations can additionally include root cause analysis that includes deep investigations into the root cause of incidents to promote the creation of customized rules and workflows to harden the posture of a network environment. Recovery operations can further include recurring engagements and review of security postures to identify areas of improvement for specific to each network environment. These operations can be implemented using any of a variety of processes and components, such as advanced machine learning, comprehensive and up-to-date threat intelligence (e.g., multiple threat intelligence sources to identify potential indicators of compromise or indicators of attack), security analyst teams, network inspections (e.g., managed intrusion and prevention systems, flow creation, network security monitoring), log analysis and search (e.g., log aggregation and correlation), cloud monitoring (e.g., IaaS and SaaS configuration, user/admin anomaly detection), endpoint visibility (e.g., operational metrics, asset data, endpoint detection and response), and/or compliance (e.g., reports and audit support). Additional and/or alternate operations and components are also possible as part of managed detection and response solutions.

Figure 7:
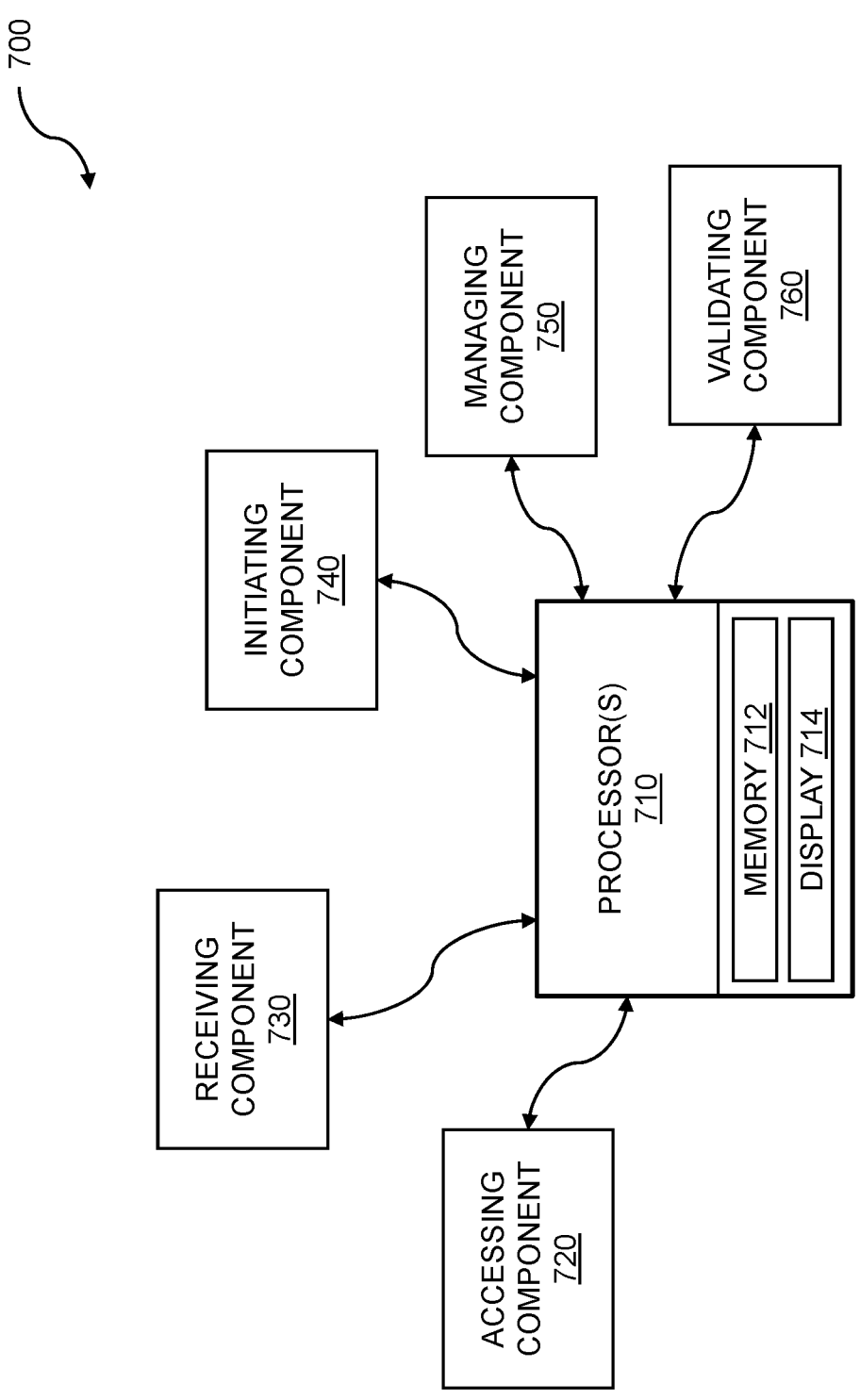
FIG. 7 is a system diagram for cybersecurity operations mitigation management.

FIG. 7 is a system diagram for cybersecurity operations mitigation management. Organizations of all sizes go to considerable and often painful lengths to secure their computing infrastructure and operations against cybersecurity threats. These organizations can include businesses, hospitals, government agencies, and schools, among many others. The detection of and response to all cybersecurity threats are critically important to each of these organizations, irrespective of their size. The organizations typically execute processing jobs based on data operations such as data manipulations, storage, security, transfers, and so on. The computing infrastructure that performs the computational operations comprises centrally located servers; widely distributed desktop computers and laptop computers; handheld electronic devices, etc. Many cybersecurity threats target and exploit hardware and software vulnerabilities, while other cybersecurity threats are based on "social engineering" techniques. These latter techniques include honeytraps, clickbait, phishing attacks, ransomware, distributed denial of service (DDOS) attacks, third-party software hacks, targeting cloud computing and storage vulnerabilities, and the like.

Cybersecurity management is based on cybersecurity operations case triage groupings. A plurality of network-connected cybersecurity threat protection applications is accessed. The cybersecurity threat protection applications can include antivirus applications, intrusion detection applications, and so on. A plurality of inputs is received from the cybersecurity threat protection applications, wherein the plurality of inputs is initiated by one or more cybersecurity events. The inputs from the cybersecurity threat protection applications can include alarms, warnings, messages, and the like. The cybersecurity events can be based on one or more detected cybersecurity threats and can include a previously experienced attack, a new attack, a combination of attacks, etc. A computer platform is used to analyze metadata associated with the plurality of inputs from the cybersecurity threat protection applications. The metadata can include a time and a frequency of cybersecurity threat protection application inputs, one or more techniques used to receive the application inputs, who or what tool provided the application inputs, etc. The inputs are triaged into groupings, based on the metadata. The groupings can establish modal commonality for the one or more cybersecurity events. A cybersecurity threat response is generated, based on the groupings. The response can include a workflow that can be developed to address, rectify, remediate, prevent, etc. the cybersecurity threat. The cybersecurity threat response can address various types of events such as a zero-day event.

The system 700 can include one or more processors 710 attached to a memory 712 which stores instructions. The system 700 can include a display 714 coupled to the one or more processors 710 for displaying data, video streams, videos, intermediate steps, instructions, and so on. In embodiments, one or more processors 710 are attached to the memory 712 where the one or more processors, when executing the instructions which are stored, are configured to: access a plurality of network-connected cybersecurity threat protection applications; receive a plurality of inputs from the cybersecurity threat protection applications, wherein the plurality of inputs is received in response to one or more cybersecurity events; initiate a cybersecurity mitigation, wherein the initiating is triggered by an analysis of the one or more cybersecurity events, wherein the analysis is performed on a network-connected computer platform; manage the cybersecurity mitigation, using the network-connected computer platform; and validate the cybersecurity mitigation, using the network-connected computer platform.

The system 700 includes an accessing component 720. The accessing component 720 can include functions and instructions for providing cybersecurity management for accessing a plurality of network-connected cybersecurity threat protection applications. In embodiments, the network-connected cybersecurity threat protection applications are part of a network-connected computer platform comprising a security automation and response (SOAR) system. The threat protection applications can monitor, protect, and defend computer systems, data systems, data networks, handheld electronic devices, and so on against various types of malicious attacks. The malicious attacks can include malware attacks, hacking attacks, denial of service attacks (DoS), distributed denial of service attacks (DDoS), man-in-the-middle attacks, ransomware attacks, and so on. The applications can include antivirus and anti-phishing applications, tools for threat hunting and threat intelligence, identity verification, endpoint protection, and so on. The applications can further include firewalls and other blocking technology. The plurality of cybersecurity threat protection applications can include at least two different data management schemas. A management schema can be based on a security domain which can contain one or more database objects. Access to the one or more database objects can be controlled by granting access privileges to each user or role, where a role can include a user, a manager, an administrator, and so on. The access can be controlled by an access control list (ACL).

The system 700 includes a receiving component 730. The receiving component 730 can include functions and instructions for receiving a plurality of inputs from the cybersecurity threat protection applications, wherein the plurality of inputs is received in response to one or more cybersecurity events. The inputs can include alarms, alerts, notifications, status changes and updates, warnings, etc. The plurality of inputs can be received from one or more network-connected cybersecurity threat protection applications. The plurality of inputs can include threat notifications. The inputs can be in reference to virus detection, Trojan horse detection, insider threat detection, cryptojacking detection, intrusion detection, and so on. The inputs that are received can include one or more signals, flags, SMS or email messages, indications, and other outputs generated by the plurality of applications. The inputs can be received as part of a cybersecurity management system (SOAR system) running on a network-connected computer platform. The inputs can include a simulated or synthetic notification, test notifications, status notifications, and so on. The simulated or test inputs can be used to determine the efficacy of detecting a threat and generating one or more inputs based on the threat. The simulated or test inputs can be used to test various threat scenarios. The testing can be based on simulation, emulation, hypothesis testing, and the like.

The system 700 includes an initiating component 740. The initiating component 740 can include functions and instructions for initiating a cybersecurity mitigation, wherein the initiating is triggered by an analysis of the one or more cybersecurity events, wherein the analysis is performed on a network-connected computer platform. In embodiments, the network-connected computer platform comprises a security automation and response (SOAR) system. The SOAR system enables the analysis of the one or more cybersecurity events. In embodiments, the SOAR network-connected computer platform can include a hand-held electronic device, a desktop or laptop computer, a server, a cloud server, a cloud-based analysis service, and so on. The analysis can determine a commonality of threats among the plurality of inputs. The commonality of threats can include virus threats, intrusion events, etc. In embodiments, the analyzing is based on parsing incoming traffic alerts from the cybersecurity threat protection applications. Since the various network-connected cybersecurity threat protection applications can be provided by a plurality of vendors, and since the inputs provided by the applications can include differing messages, formats, etc., the traffic alerts can be parsed and compared. That is, the inputs can be received from more than one cybersecurity threat protection application, and the formats of the inputs can be different. An "alert" from one application may be labeled as an "alarm" by another, while both applications can detect the same virus attack. The cybersecurity mitigating is performed by at least one threat protection application of the plurality of network-connected cybersecurity threat protection applications, wherein the cybersecurity mitigation is performed by the SOAR network-connected computer platform.

The system 700 includes a managing component 750. The managing component 750 can include functions and instructions for managing the cybersecurity mitigation, using the network-connected computer platform. In embodiments, the cybersecurity mitigation is performed by at least one threat protection application of the plurality of network-connected cybersecurity threat protection applications, wherein the cybersecurity mitigation is performed by the network-connected computer platform. In embodiments, the network-connected computer platform comprises a security automation and response (SOAR) system. The SOAR system enables the managing of the one or more cybersecurity events. In embodiments, the managing cybersecurity can include graphical control of the plurality of cybersecurity threat protection applications. The graphical control can enable dragging and dropping of tasks, commands, and so on into a workflow. In other embodiments, the automation workflows can support dynamic swapping of cybersecurity threat protection applications. The workflows can support swapping-in or swapping-out one or more threat protection applications. The swapping-in and the swapping-out are enabled by a universal data layer (UDL). The UDL enables applications to be swapped without having to edit a workflow or create a new workflow to address the swapped-in application.

The system 700 includes a validating component 760. The validating component 760 can include functions and instructions for validating the cybersecurity mitigation, using the network-connected computer platform. In embodiments, the network-connected computer platform comprises a security automation and response (SOAR) system. The SOAR system enables the validating of the cybersecurity mitigation. The validating includes creating a library of cybersecurity mitigation success metrics. Data from cybersecurity experts and from recorded events in the SOAR network-connected computer platform can be converted to machine learning training data. The data can contain information about the plurality of cybersecurity threat protection applications and logged incidents of successful mitigating steps. The training data can further include historical data associated with past inputs received, synthetic data generated for machine learning training purposes, and so on. The training data is accompanied by expected outcomes inferred based on processing or analyzing the training data. The expected outcomes can include determining a true positive analysis of inputs, confirming a true positive threat event, and the like. The expected outcomes can include workflows to locate, remove, remediate, etc. the cybersecurity threat. The expected outcomes can include actions such as one or more of removing the virus from the email messages, blocking the sender of the messages, updating antivirus software, pushing antivirus software updates out to client computers and portable devices, etc. A neural network can be trained using the machine learning training data. The training of the neural network can include providing training data to the neural network, observing inferences formed by the neural network, adjusting weights associated with nodes within the neural network, and so on. The observing and adjusting can continue until the neural network is able to form the expected inferences (outcomes) for the training data provided. Once the training data has been analyzed and integrated into the neural network, it can be used to execute the analyzing, the triaging, and the generating on the neural network that was trained.

The validating is based on achieving one or more of the cybersecurity mitigation success metrics. The success metrics comprise cybersecurity validators, including success criteria and a time factor, wherein the time factor includes a number of days post-mitigation initiation. Validating the cybersecurity mitigation includes confirming that the selected mitigation steps are taken; measuring the effectiveness of the mitigation steps; recording the speed of detection, analysis, mitigation process selection, and mitigation deployment; reporting on the mitigation steps, and updating logs and other archive repositories related to cybersecurity events. The success metrics comprise cybersecurity validators, including success criteria and a time factor. The time factor includes several days of post-mitigation initiation. The validating is based on achieving one or more of the cybersecurity mitigation success metrics. A successful cybersecurity mitigation can be described as an event in which a cybersecurity threat is detected and correctly identified as soon as it comes into contact with the first network node or group of nodes under attack; in which the correct mitigation steps are selected and brought to bear on the threat immediately after the threat is identified; in which the correct mitigation steps are successfully deployed and implemented on all network points under threat; in which prevention steps are clearly identified and put in place to prevent future occurrences; and in which all steps taken from the beginning to the end of the event are clearly logged and documented for network security staff and control systems to review and integrate into future security policies. Since cybersecurity attacks are frequent and continue to change as culprits refine their attempts to interfere with and steal from legitimate computer networks, security systems, policies, and practices must continue to learn and grow to maintain proper functioning of the systems and users they serve. Comparing the sequence, the timing, and the effectiveness of cybersecurity mitigation steps taken to previous successful events stored in the library allows the SOAR system to confirm successful mitigation as one or more of the success metrics is achieved or exceeded.

The validating includes updating the library of the library of cybersecurity mitigation success metrics. In embodiments, the updating is based on additional input from the cybersecurity threat protection applications and analysis by the SOAR network-connected computer platform. The analysis by the SOAR system includes metadata analysis, wherein the metadata is received from at least one of the plurality of cybersecurity threat protection applications. The updating is further based on human-supplied input and a machine learning model, wherein the machine learning model is trained using cybersecurity mitigation completion success data. The neural network can continue to "learn" based on processing of data other than training data. The learning can be accomplished by the network to improve convergence speed, inference accuracy, etc. Human-supplied input can include data from other systems not directly connected to the SOAR system as well as direct observations made by security and support staff. It can also include scores and ratings given by users and support staff regarding the effectiveness of communications, speed of responses, impact of downtime, and so on. Suggestions of additional parameters to use in the SOAR assessment criteria can also be made by human input.

In embodiments, the validating component 760 provides a mitigation completion confirmation. In embodiments, some cybersecurity mitigation steps can take many hours or days to complete. Large networks with a plurality of users, network infrastructure nodes, applications, servers, and databases can require many hours to receive, validate, update, and report progress to security applications and management systems for each cybersecurity mitigation event. In a large network, it can be the case that not all users are logged into a network at the same time; or not all printers or other peripheral devices are turned on, or they are in use to a degree that requires mitigation steps to wait for off-hours to execute. In some cases, decisions must be made by security staff or machine learning models weighing potential risks of cybersecurity threats with network system availability requirements. In embodiments, the SOAR network-connected computer platform collects logs and other status data from the plurality of cybersecurity threat protection applications as mitigation steps are deployed and implemented. As mitigation steps execute and complete, logs recording the success or failure of the installation are generated and copies are sent back to the SOAR systems overseeing the installations. Emails or text messages can be generated to users informing them of the need to log into the network to receive the patch. Help desk systems and personnel can be updated to follow up with users whose hardware failed to complete the patch update successfully, or who have not logged into the network to receive and install the patch in an acceptable time. As the anti-virus software success and failure logs are accumulated by the SOAR management system, a mitigation completion report showing the number of network nodes remaining and percentage of completions can be generated for the network security staff and the machine learning model. Times to deploy, install, and validate the virus patch can be collected and included in the mitigation completion confirmation reporting. The mitigation completion confirmation data can be analyzed to look for ways to improve deployment procedures; target older hardware or software versions to be updated, repaired, or replaced; follow up with support staff regarding improved procedures; inform users and management of the success rate of the cybersecurity threat mitigation processes, and so on.

Disclosed embodiments include a computer program product embodied in a non-transitory computer readable medium for cybersecurity management, the computer program product comprising code which causes one or more processors to perform operations of: accessing a plurality of network-connected cybersecurity threat protection applications; receiving a plurality of inputs from the cybersecurity threat protection applications, wherein the plurality of inputs is received in response to one or more cybersecurity events; initiating a cybersecurity mitigation, wherein the initiating is triggered by an analysis of the one or more cybersecurity events, wherein the analysis is performed on a network-connected computer platform; managing the cybersecurity mitigation, using the network-connected computer platform; and validating the cybersecurity mitigation, using the network-connected computer platform.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams, infographics, and flowchart illustrations depict methods, apparatus, systems, and computer program products. The elements and combinations of elements in the block diagrams, infographics, and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for cybersecurity management comprising:

accessing a plurality of network-connected cybersecurity threat protection applications, wherein one of the plurality of network-connected cybersecurity threat protection applications comprises a distributed denial of service (DDoS) threat protection application;

receiving a plurality of inputs from the cybersecurity threat protection applications, wherein the plurality of inputs is received in response to one or more cybersecurity events that are detected in a computer network, wherein the one or more cybersecurity events comprise one or more DDoS attacks;

initiating a computer-implemented cybersecurity threat mitigation response, wherein the initiating is triggered by an analysis of the one or more cybersecurity events that are detected in the computer network;

managing the computer-implemented cybersecurity threat mitigation response, using a network-connected computer platform, wherein the managing comprises analyzing (i) a threat associated with the one or more DDoS attacks, (ii) a scope of an impact associated with the one or more DDoS attacks, and (iii) compute resources required to deploy the computer-implemented cybersecurity threat mitigation response, wherein analyzing comprises using a machine learning model trained on data comprising historical outcomes of detecting and mitigating past cybersecurity threat events to determine resource availability; and validating the computer-implemented cybersecurity threat mitigation response to the one or more DDoS attacks, using the network-connected computer platform, wherein the validating is based on achieving one or more predetermined cybersecurity threat mitigation success metrics.

2. The method of claim 1, further comprising creating a library of cybersecurity threat mitigation success metrics.

3. The method of claim 2, wherein the success metrics comprise cybersecurity validators.

4. The method of claim 3, wherein the cybersecurity validators include success criteria.

5. The method of claim 3, wherein the cybersecurity validators include a time factor.

6. The method of claim 5, wherein the time factor includes a number of days post-mitigation initiation.

7. The method of claim 2, further comprising updating the library of cybersecurity threat mitigation success metrics.

8. The method of claim 7, wherein the updating is based on an additional input from the cybersecurity threat protection applications.

9. The method of claim 7, wherein the updating is based on analysis by the network-connected computer platform.

10. The method of claim 9, wherein the analysis includes metadata analysis, wherein metadata is received from at least one of the plurality of cybersecurity threat protection applications.

11. The method of claim 7, wherein the updating is based on human-supplied input.

12. The method of claim 7, wherein the updating is based on a machine learning model that was trained using a cybersecurity threat mitigation completion success.

13. The method of claim 1, wherein the validating provides a mitigation completion confirmation.

14. The method of claim 1, wherein the cybersecurity threat mitigation is performed by at least one threat protection application of the plurality of network-connected cybersecurity threat protection applications.

15. The method of claim 1, wherein the cybersecurity threat mitigation is performed by the network-connected computer platform.

16. The method of claim 1, wherein the network-connected computer platform comprises a security automation and response (SOAR) system.

17. The method of claim 16, wherein the SOAR system is configured to enable at least one of (i) the analysis of the one or more cybersecurity events, (ii) the managing the cybersecurity threat mitigation, or (iii) the validating the cybersecurity threat mitigation.

18. A computer program product embodied in a non-transitory computer readable medium for video analysis, the computer program product comprising code which causes one or more processors to perform operations of:

accessing a plurality of network-connected cybersecurity threat protection applications wherein one of the plurality of network-connected cybersecurity threat protection applications comprises a distributed denial of service (DDoS) threat protection application;

receiving a plurality of inputs from the cybersecurity threat protection applications, wherein the plurality of inputs is received in response to one or more cybersecurity events that are detected in a computer network, wherein the one or more cybersecurity events comprise one or more DDoS attacks;

initiating a computer-implemented cybersecurity threat mitigation response, wherein the initiating is triggered by an analysis of the one or more cybersecurity events that are detected in the computer network;

managing the computer-implemented cybersecurity threat mitigation response, using a network-connected computer platform, wherein the managing comprises analyzing (i) a threat associated with the one or more DDoS attacks, (ii) a scope of an impact associated with the one of more DDoS attacks, and (iii) compute resources required to deploy the computer-implemented cybersecurity threat mitigation response, wherein analyzing comprises using a machine learning model trained on data including historical outcomes of detecting and mitigating past cybersecurity threat events to determine resource availability; and validating the computer-implemented cybersecurity threat mitigation response to the one or more DDoS attacks, using the network-connected computer platform wherein the validating is based on achieving one or more predetermined cybersecurity threat mitigation success metrics.

19. A computer system for video analysis, comprising:

a memory which stores instructions;

one or more processors attached to the memory wherein the one or more processors, when executing the instructions which are stored, perform operations comprising:

accessing a plurality of network-connected cybersecurity threat protection applications, wherein one of the plurality of network-connected cybersecurity threat protection applications comprises a distributed denial of service (DDoS) threat protection application;

receiving a plurality of inputs from the cybersecurity threat protection applications, wherein the plurality of inputs is received in response to one or more cybersecurity events that are detected in a computer network, wherein the one or more cybersecurity events comprise one or more DDoS attacks;

initiating a computer-implemented cybersecurity threat mitigation response, wherein the initiating is triggered by an analysis of the one or more cybersecurity events that are detected in the computer network;

managing the computer-implemented cybersecurity threat mitigation response, using a network-connected computer platform, wherein the managing comprises analyzing (i) a threat associated with the one or more DDoS attacks, (ii) a scope of an impact associated with the one or more DDoS attacks, and (iii) compute resources required to deploy the computer-implemented cybersecurity threat mitigation response, wherein analyzing comprises using a machine learning model trained on data including historical outcomes of detecting and mitigating past cybersecurity threat events to determine resource availability; and validating the computer-implemented cybersecurity threat mitigation response to the one or more DDoS attacks, using the network-connected computer platform wherein the validating is based on achieving one or more predetermined cybersecurity threat mitigation success metrics.

20. The computer system of claim 19, wherein the operations further comprise:

creating a library of cybersecurity threat mitigation success metrics, and updating the library of cybersecurity threat mitigation success metrics wherein the updating is based on a machine learning model that was trained using a cybersecurity threat mitigation completion success.

\* \* \* \* \*